(12) United States Patent
Wallace et al.

(10) Patent No.: US 10,355,295 B2
(45) Date of Patent: Jul. 16, 2019

(54) FUEL CELL CARTRIDGE

(71) Applicant: Intelligent Energy Limited, Loughborough (GB)

(72) Inventors: Andrew Wallace, Davis, CA (US); John Melack, Winters, CA (US); Paul Getchel, Placerville, CA (US)

(73) Assignee: Intelligent Energy Limited, Loughborough (GB)

( * ) Notice: Subject to any disclaimer, the term of this patent is extended or adjusted under 35 U.S.C. 154(b) by 0 days.

(21) Appl. No.: 15/266,958

(22) Filed: Sep. 15, 2016

(65) Prior Publication Data

US 2017/0005349 A1    Jan. 5, 2017

Related U.S. Application Data

(63) Continuation of application No. PCT/US2015/021557, filed on Mar. 19, 2015.
(Continued)

(51) Int. Cl.
| | | |
|---|---|---|
| *H01M 8/04* | (2016.01) | |
| *H01M 8/04082* | (2016.01) | |
| *H01M 8/065* | (2016.01) | |
| *H01M 8/04746* | (2016.01) | |
| *C01B 3/06* | (2006.01) | |

(Continued)

(52) U.S. Cl.
CPC .......... *H01M 8/04208* (2013.01); *C01B 3/06* (2013.01); *C01B 3/065* (2013.01); *H01M 8/04291* (2013.01); *H01M 8/04746* (2013.01); *H01M 8/04776* (2013.01); *H01M 8/065* (2013.01); *H01M 8/0606* (2013.01);
(Continued)

(58) Field of Classification Search
None
See application file for complete search history.

(56) References Cited

U.S. PATENT DOCUMENTS

| | | |
|---|---|---|
| 7,271,567 B2 | 9/2007 | Dunn et al. |
| 7,316,788 B2 | 1/2008 | Autrey et al. |
| (Continued) | | |

FOREIGN PATENT DOCUMENTS

| | | |
|---|---|---|
| EP | 2163299 A1 | 3/2010 |
| JP | 2006-069869 A | 3/2006 |
| (Continued) | | |

OTHER PUBLICATIONS

International Patent Application No. PCT/US2015/021557; Int'l Search Report and the Written Opinion; dated Jun. 30, 2015; 15 pages.

(Continued)

*Primary Examiner* — Wyatt P McConnell
(74) *Attorney, Agent, or Firm* — BakerHostetler

(57) ABSTRACT

This disclosure is drawn to systems, devices, apparatuses, and/or methods, related to fuel cell cartridges. Specifically, the disclosed systems, devices, apparatuses, and/or methods relate to compact fuel cell cartridges for producing hydrogen gas for use by fuel cells. Some example fuel cell cartridges may include a reactor module for storing a reactant, a water module for storing water, and an interface coupling the reactor module and the water module. The interface may permit the water to flow from the water module to the reactor module such that the water mixes with the reactant in the reactor module to form a gas (e.g., hydrogen gas) that may exit through a gas outlet.

9 Claims, 22 Drawing Sheets

Related U.S. Application Data

(60) Provisional application No. 61/955,357, filed on Mar. 19, 2014.

(51) Int. Cl.
  *H01M 8/04291* (2016.01)
  *H01M 8/0606* (2016.01)

(52) U.S. Cl.
  CPC .. *B01J 2219/0002* (2013.01); *H01M 2250/30* (2013.01); *Y02B 90/18* (2013.01); *Y02E 60/362* (2013.01)

(56) References Cited

U.S. PATENT DOCUMENTS

| | | |
|---|---|---|
| 7,578,992 B2 | 8/2009 | Mohajeri et al. |
| 7,682,411 B2 | 3/2010 | Jones et al. |
| 8,118,893 B2 | 2/2012 | Rosenzweig et al. |
| 2009/0017347 A1 | 1/2009 | Damery et al. |
| 2010/0247426 A1 | 9/2010 | Wallace et al. |
| 2011/0194992 A1 | 8/2011 | Barton et al. |
| 2011/0212374 A1 | 9/2011 | Rosenzweig et al. |
| 2011/0240159 A1 | 10/2011 | Curello et al. |
| 2013/0115139 A1 | 5/2013 | Stern |

FOREIGN PATENT DOCUMENTS

| | | |
|---|---|---|
| JP | 2009-039710 A | 2/2009 |
| JP | 2009-230902 A | 10/2009 |
| JP | 2013-049584 A | 3/2013 |
| JP | 2013-518805 A | 5/2013 |

OTHER PUBLICATIONS

International Patent Application No. PCT/US2015/021557; Int'l Preliminary Report on Patentability; dated Sep. 29, 2016; 11 pages.
European Patent Application No. 15764542.5; Extended Search Report; dated Mar. 14, 2018; 9 pages.

|  | FIG. 2A | FIG. 2B | FIG. 2C |
| --- | --- | --- | --- |
| Gas Required (L) | 19.0 | 19.0 | 19.0 |
| Theoretical NaSi (g) | 16.0 | 16.0 | 16.0 |
| Conversion (%) | 0.85 | 0.85 | 0.85 |
| Actual NaSi (g) | 18.8 | 18.8 | 18.8 |
| Over-stoich $H_2O$ (%) | 1.5 | 1.5 | 1.5 |
| $H_2O$ Required (mL) | 41.4 | 41.4 | 41.4 |
| Void Volume (mL) | 15.0 | 33.8 | 15 |
| Divider Volume (mL) | 5.0 | 7.0 | 8.0 |
| Spring Volume (mL) | 0.0 | 6.0 | 6.0 |
| Total Internal Volume (mL) | 80.2 | 107.0 | 89.2 |
| Component Overhead | 15% | 20% | 20% |
| Final Cartridge Volume (mL) | 92.2 | 128.4 | 107.1 |
| Requirement Volume (mL) | <160.0 | <160.0 | <160.0 |

FIG. 3

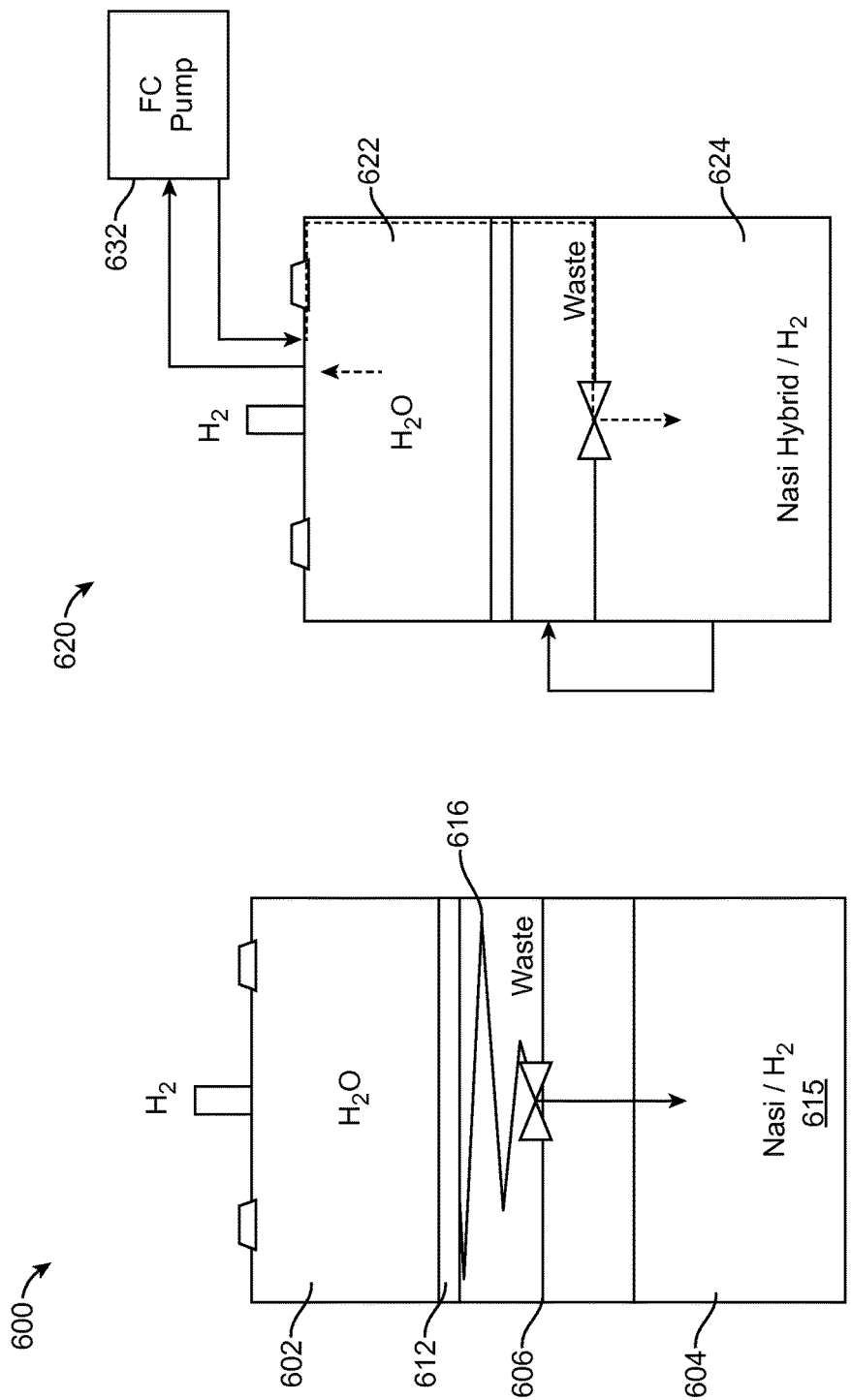

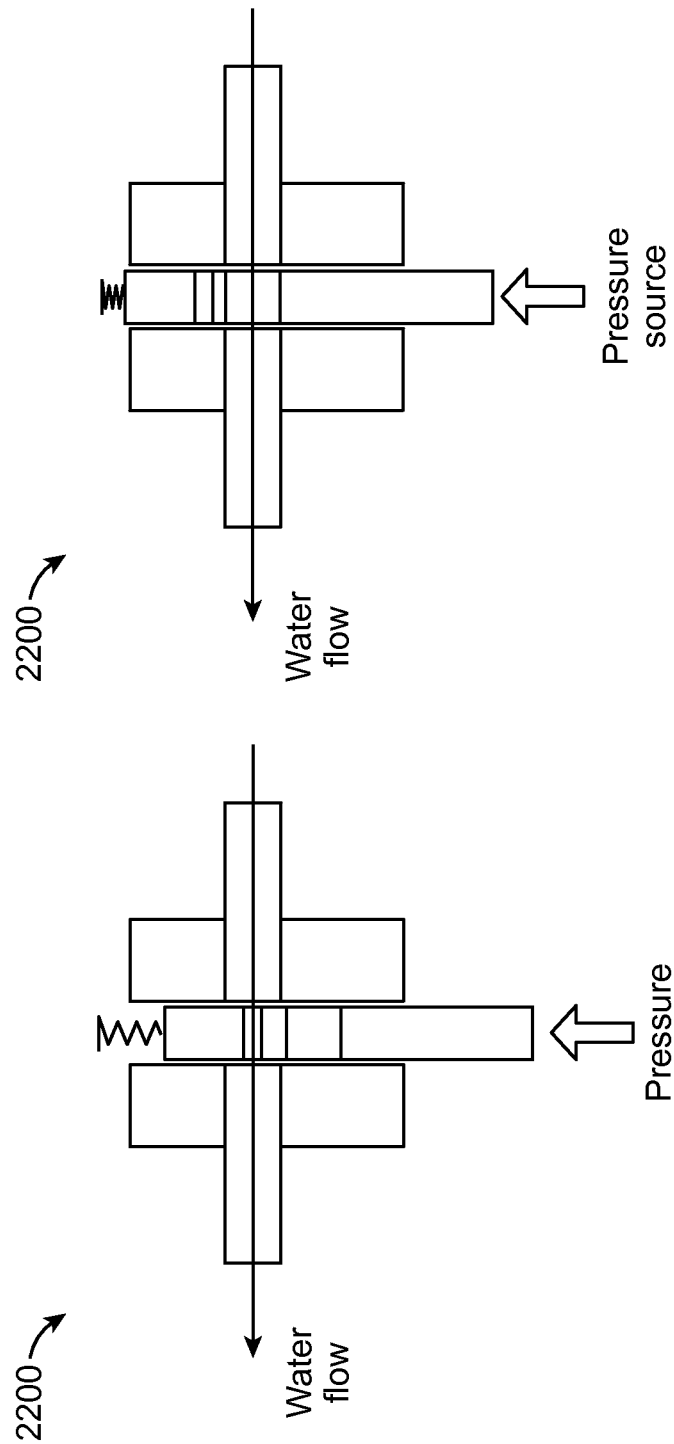

FUEL CELL CARTRIDGE

CROSS-REFERENCE TO RELATED APPLICATIONS

This application is a continuation of International Patent Application PCT/US2015/021557 filed Mar. 19, 2015, which claims priority to U.S. Provisional Patent Application Ser. No. 61/955,357, titled "Fuel Cell Cartridge," filed on Mar. 19, 2014, the contents of which including all figures and appendices are incorporated herein by this reference as if they were fully set forth herein in their entirety.

BACKGROUND

Fuel cells are electrochemical energy conversion devices that convert an external source fuel into electrical current. Many fuel cells use hydrogen as the fuel and oxygen (typically from air) as an oxidant. The by-product for such a fuel cell is water, making the fuel cell a very low environmental impact device for generating power.

Fuel cells compete with numerous other technologies for producing power, such as the gasoline turbine, the internal combustion engine, and the battery. A fuel cell provides a direct current (DC) voltage that can be used for numerous applications including stationary power generation, lighting, back-up power, consumer electronics, personal mobility devices, such as electric bicycles, as well as landscaping equipment, and other applications. There are a wide variety of fuel cells available, each using a different chemistry to generate power. Fuel cells are usually classified according to their operating temperature and the type of electrolyte system that they utilize. One common fuel cell is the polymer exchange membrane fuel cell (PEMFC), which uses hydrogen as the fuel with oxygen (usually air) as its oxidant. It has a high power density and a low operating temperature of usually below 80° C. These fuel cells are reliable with modest packaging and system implementation requirements.

The challenge of hydrogen storage and generation has limited the wide-scale adoption of PEM fuel cells. Although molecular hydrogen has a very high energy density on a mass basis, as a gas at ambient conditions it has very low energy density by volume. The techniques employed to provide hydrogen to portable applications are widespread, including high pressure and cryogenics, but they have most often focused on chemical compounds that reliably release hydrogen gas on-demand. Three broadly accepted mechanisms used to store hydrogen in materials are absorption, adsorption, and chemical reaction.

In absorptive hydrogen storage for fueling a fuel cell, hydrogen gas is absorbed directly at high pressure into the bulk of a specific crystalline material, such as a metal hydride. Metal hydrides such as MgH2, NaAlH4, and LaNi5H6, can be used to store the hydrogen gas reversibly. However, metal hydride systems often suffer from poor specific energy (i.e., a low hydrogen storage to metal hydride mass ratio) and poor input/output flow characteristics. The hydrogen flow characteristics are driven by the endothermic properties of metal hydrides (the internal temperature drops when removing hydrogen and rises when recharging with hydrogen). Because of these properties, metal hydrides tend to be heavy and require complicated systems to rapidly charge and/or discharge them. For example, see U.S. Pat. No. 7,271,567 for a system designed to store and then controllably release pressurized hydrogen gas from a cartridge containing a metal hydride or some other hydrogen-based chemical fuel. This system also monitors the level of remaining hydrogen capable of being delivered to the fuel cell by measuring the temperature and/or the pressure of the metal hydride fuel itself and/or by measuring the current output of the fuel cell to estimate the amount of hydrogen consumed.

In adsorption hydrogen storage for fueling a fuel cell, molecular hydrogen is associated with the chemical fuel by either physisorption or chemisorption. Chemical hydrides, such as lithium hydride (LiH), lithium aluminum hydride (LiAlH4), lithium borohydride (LiBH4), sodium hydride (NaH), sodium borohydride (NaBH4), and the like, are used to store hydrogen gas non-reversibly. Chemical hydrides produce large amounts of hydrogen gas upon reaction with water as shown below:

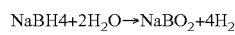

To reliably control the reaction of chemical hydrides with water to release hydrogen gas from a fuel storage device, a catalyst must be employed along with control of the water's pH. Additionally, the chemical hydride is often embodied in a slurry of inert stabilizing liquid to protect the hydride from early release of its hydrogen gas.

In chemical reaction methods for producing hydrogen for a fuel cell, often hydrogen storage and hydrogen release are catalyzed by a modest change in temperature or pressure of the chemical fuel. One example of this chemical system, which is catalyzed by temperature, is hydrogen generation from ammonia-borane by the following reaction:

The first reaction releases 6.1 wt. % hydrogen and occurs at approximately 120° C., while the second reaction releases another 6.5 wt. % hydrogen and occurs at approximately 160° C. These chemical reaction methods do not use water as an initiator to produce hydrogen gas, do not require a tight control of the system pH, and often do not require a separate catalyst material. However, these chemical reaction methods are plagued with system control issues often due to the common occurrence of thermal runaway. See, for example, U.S. Pat. No. 7,682,411, for a system designed to thermally initialize hydrogen generation from ammonia-borane and to protect from thermal runaway. See, for example, U.S. Pat. Nos. 7,316,788 and 7,578,992, for chemical reaction methods that employ a catalyst and a solvent to change the thermal hydrogen release conditions.

As more and more application for fuel cells are developed, new and improved designs for fuel cell cartridges which provide the hydrogen to the fuel cell system are needed.

DESCRIPTION—SUMMARY

In one aspect, the present disclosure discloses a fuel cell cartridge, which may include a reactor module for storing a reactant, a water module for storing water, and an interface therebetween. The interface may permit the water to flow from the water module to the reactor module such that the water mixes with the reactant in the reactor module to form a gas that may exit through a gas outlet.

In another aspect, the present disclosure discloses a method of producing a hydrogen gas, which may include coupling an end of a water module to a reactor module. The water module may store water and the reactor module may store a reactant. The method may also include controlling the flow of the water between the water module and the reactor module such that at least a portion of the water in the water module mixes with the reactant in the reactor module, thereby producing the hydrogen gas.

In yet another aspect, the present disclosure discloses a hydrogen gas production system that may include a housing, and interface in the housing, and an outlet for outleting hydrogen gas. The interface inside the housing may define a reactor cavity and a water cavity in the housing. The reactor cavity may be in fluid communication with the water cavity such that a reactant in the reactor cavity contacts water from the water cavity producing a hydrogen gas.

BRIEF DESCRIPTION OF THE DRAWINGS

The foregoing and other features of the present disclosure will become more fully apparent from the following description and appended claims, taken in conjunction with the accompanying drawings. Understanding that these drawings depict several embodiments in accordance with the disclosure and are, therefore, not to be considered limiting of its scope, the disclosure will be described with additional specificity and detail through use of the accompanying drawings.

In the drawings:

FIGS. 1A, 1B, 2A, 2B, 2C, 4A, 4B, 5A, 5B, 6A, 6B, 7A, and 7B are schematic representations of various example fuel cell cartridges in accordance with at least some examples of the present disclosure;

FIG. 3 is a table depicting example characteristics of the example fuel cell cartridges of FIGS. 2A, 2B, and 2C, respectively, in accordance with at least some examples of the present disclosure;

FIGS. 21A, 21B, 22A, and 22B are schematic representations of example switching mechanisms for an example fuel cell cartridge in accordance with at least some examples of the present disclosure.

Figures 1A, 1B:
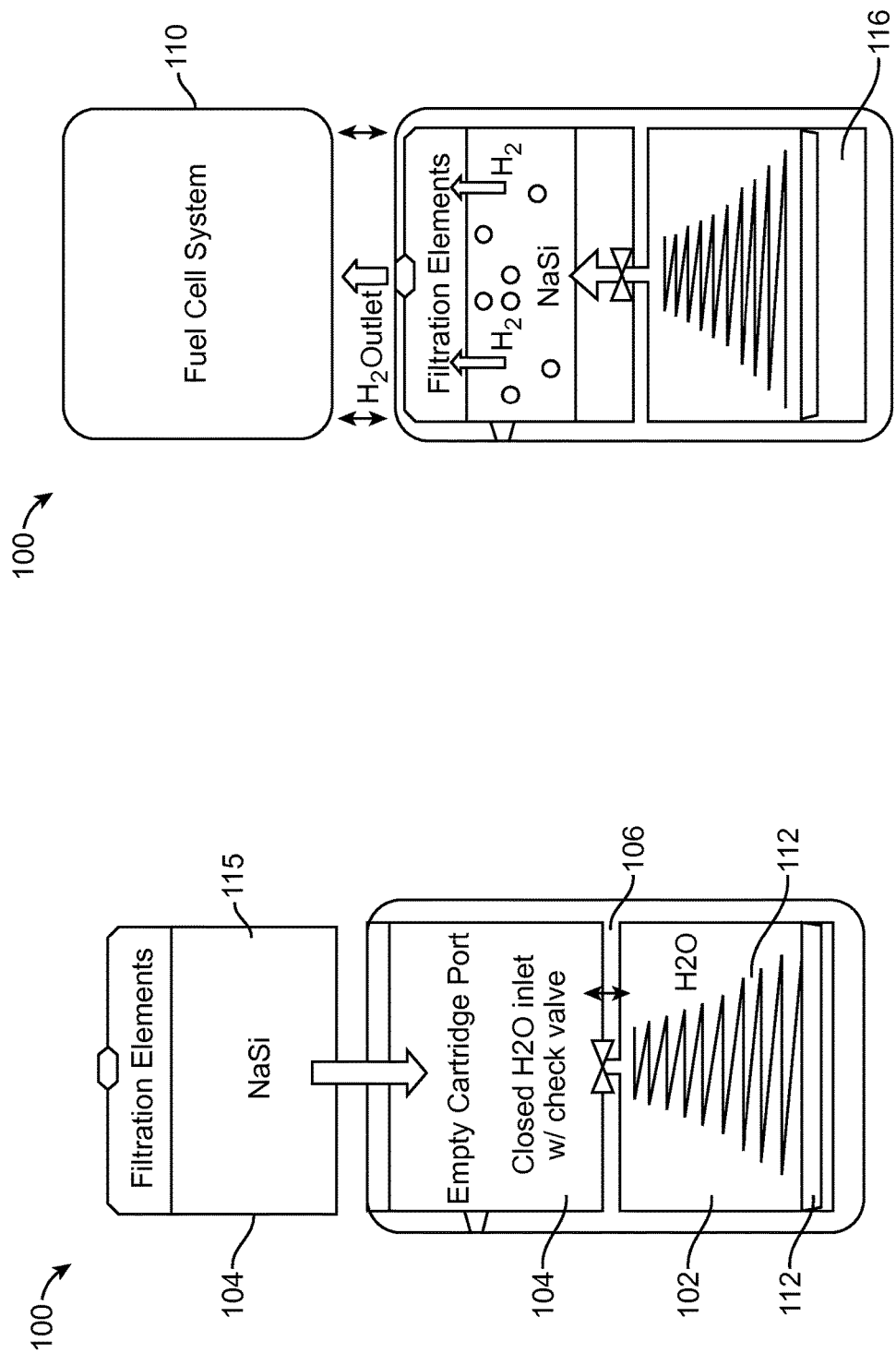

All callouts and descriptions in the Figures are hereby incorporated by this references as if fully set forth herein.

FURTHER DESCRIPTION

In the following detailed description, reference is made to the accompanying drawings, which form a part hereof. In the drawings, similar symbols identify similar components, unless context dictates otherwise. The illustrative embodiments described in the detailed description and drawings are not meant to be limiting and are for explanatory purposes. Other embodiments may be utilized, and other changes may be made, without departing from the spirit or scope of the subject matter presented herein. It will be readily understood that the aspects of the present disclosure, as generally described herein, and illustrated in the drawings, may be arranged, substituted, combined, and designed in a wide variety of different configurations, each of which are explicitly contemplated and made part of this disclosure.

This disclosure is drawn to systems, devices, apparatuses, and/or methods, related to fuel cell cartridges. Specifically, the disclosed systems, devices, apparatuses, and/or methods relate to compact fuel cell cartridges for producing hydrogen gas for use by fuel cells.

FIGS. 1A, 1B, 2A, 2B, 2C, 4A, 4B, 5A, 5B, 6A, 6B, 7A, and 7B are schematic representations of various example fuel cell cartridges 100, 200, 220, 240, 400, 500, 600, 620, 700 in accordance with at least some examples of the present disclosure. In some examples, a fuel cell cartridge (or more simply, cartridges) 100, 200, 220, 240, 400, 500, 600, 620, 700 may include a water module 102, 202, 222, 242, 402, 502, 602, 622, 702, a reactor module 104, 204, 224, 244, 404, 504, 604, 624, 704, and an interface 106, 206, 226, 246, 406, 506, 606, 626, 706 between the two. In some examples, the fuel cell cartridges 100, 200, 220, 240, 400, 500, 600, 620, 700 may also include a control manifold for interfacing with the fuel cell 110. In some examples, a fuel cell cartridge 100, 200, 220, 240, 400, 500, 600, 620, 700 may also include a water control mechanism 112, 212, 232, 252, 412, 512, 612, 632, 712 to control water flow between the water module 102, 202, 222, 242, 402, 502, 602, 622, 702 and the reactor module 104, 204, 224, 244, 404, 504, 604, 624, 704.

Some example fuel cell cartridges may be deemed "active" fuel cell cartridges 200, 620, 700 or "passive" fuel cell cartridges 100, 220, 240, 400, 500, 600 based on the type of water control mechanism employed.

For example, the fuel cell cartridges 200, 620, 700 of FIGS. 2A, 6B, 7A, and 7B are considered active due to the external water control mechanism 212, 632, 712 that generates and controls the flow of water in the fuel cell cartridges 200, 620, 700. These external control mechanisms 212, 632, 712 generally require external power to operate. Generally, active fuel cell cartridge systems 200, 620, 700 utilize a pump 212, 632, 712 or an alternative means to control water delivery to the reactant based on demand or other controlling variables. An active system 200, 620, 700 would may use a water pump 212, 632, 712 to electronically control the flow of water into the reactor module 204, 624, 704 or chamber; this architecture, however, results in higher fuel cell costs and more fuel cell system complexity. For example, as depicted in these figures, a water pump 212, 632, 712 may interface with the fuel cell cartridges 200, 620, 700 via fluid connections for water inlet, water outlet, and/or hydrogen gas outlet. As observed from the figures, water may be pulled in from the cartridge 200, 620, 700 through the water pump 212, 632, 712 and pumped back into the cartridge 200, 620, 700. Other active cartridge architectures are also contemplated by the present disclosure.

The fuel cell cartridges 100, 220, 240, 400, 500, 600 of FIGS. 1A, 1B, 2B, 2C, 4A, 4B, 5A, 5B, and 6A are considered passive because they require no external mechanisms to generate water flow in the fuel cell cartridges 100, 220, 240, 400, 500, 600. For example, these figures depict fuel cell cartridges 100, 220, 240, 400, 500, 600 in which water is compressed with a spring 112, 232, 252, 412, 512, 612 which drives water from the water module 102, 222, 242, 402, 502, 602 into the reactor module 104, 224, 244, 404, 504, 604. In example passive systems, the water may be pressurized by a spring 112, 232, 252, 412, 512, 612, bladder, gas overpressure, and/or gas pressure feedback. Some example passive systems 100, 220, 240, 400, 500, 600 may use a spring 112, 232, 252, 412, 512, 612 to pressure feed the water into the reactor module 104, 224, 244, 404, 504, 604 or chamber. In some examples, the spring 112, 232, 252, 412, 512, 612 may be tapered whereby it can lie very flat when fully compressed. Passive systems 100, 220, 240, 400, 500, 600 may be advantageous in that they do not require electronic controls.

In some passive fuel cell cartridge systems 100, 220, 240, 400, 500, 600, using a pressurized water supply, the system becomes self-regulated; the water is allowed to flow when the downstream pressure is lower than the water source, and is stopped if the downstream pressure is high. This type of system is considered a passive architecture as there is no sensor or actuator element involved.

In some examples, a "hybrid" active/passive architecture may be provided where a spring pressurizes the water, but a mechanical actuator actuates an on/off water valve. This may enables much of the control sophistication of an active system, but it provides much of the passive simplicity. For example, an actuation mechanism to actuate a valve is typically includes less costly components to make than an actual water pump. Such a hybrid system may have interface that only requires a single fluid connection for hydrogen exit.

Figure 2C:
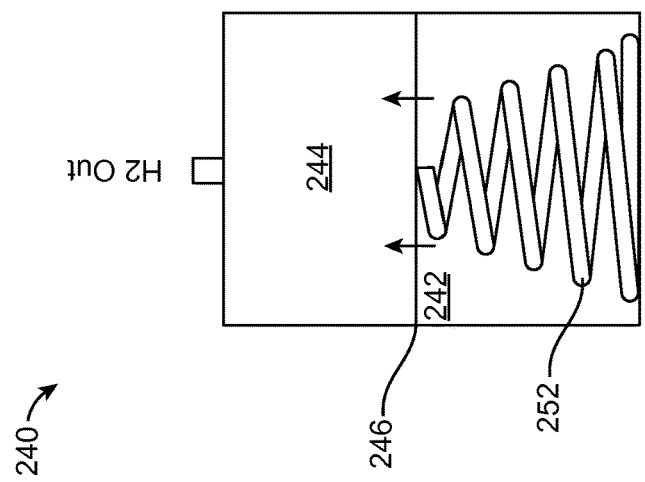
Figure 2B:
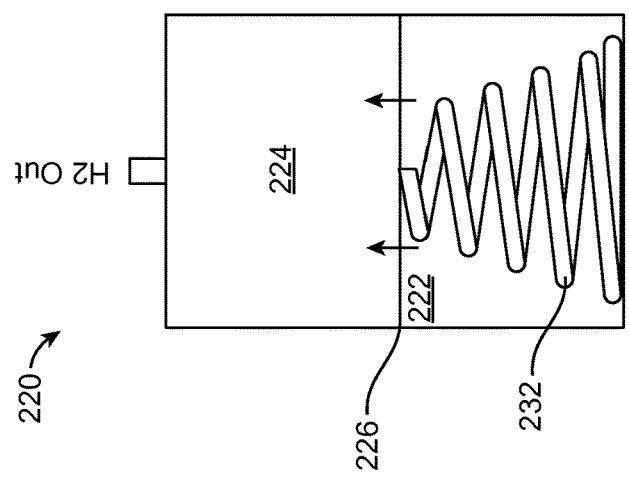
Figure 2A:
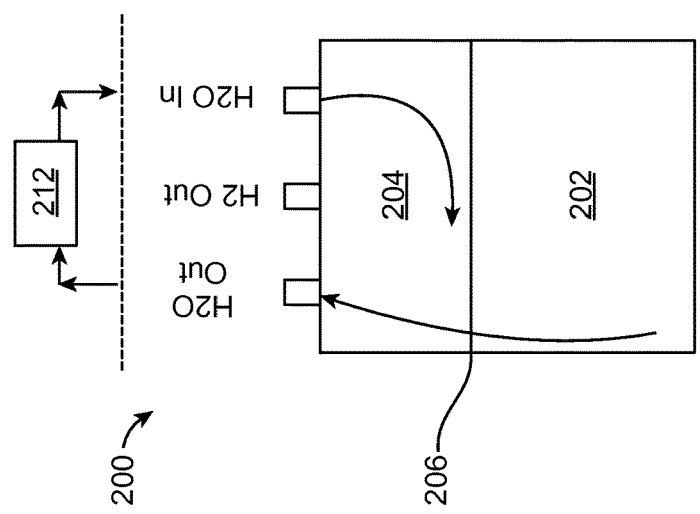

FIG. 3 is a table 300 depicting example characteristics of the example fuel cell cartridges 200, 220, 240 of FIGS. 2A, 2B, and 2C, respectively, in accordance with at least some examples of the present disclosure.

Figure 4B:
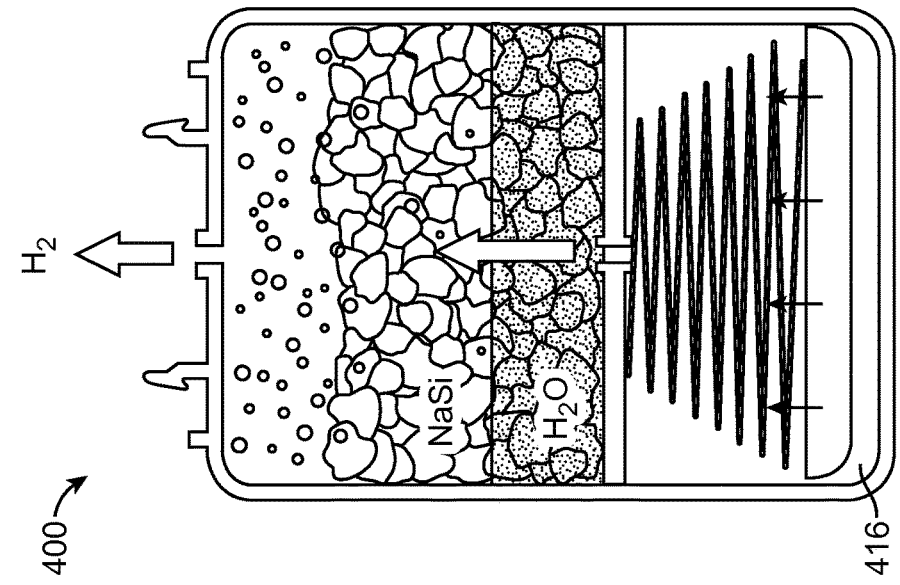
Figure 4A:
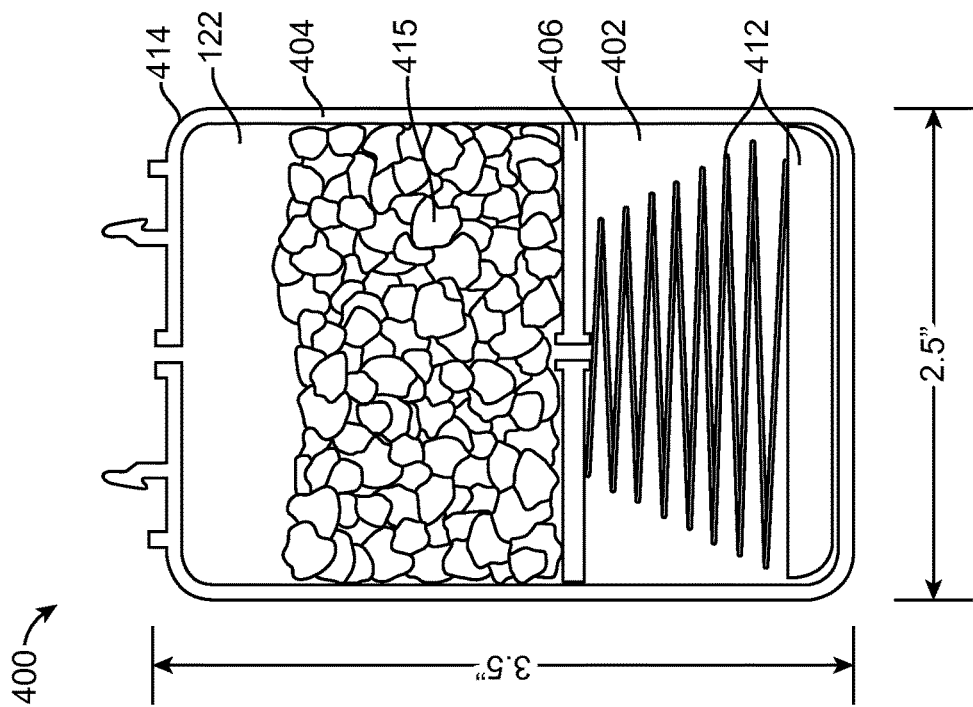

FIGS. 4A, 4B, 5A, and 5B depict the structure and operation of some example fuel cell cartridges 400, 500 in accordance with at least some examples of the present disclosure. FIGS. 4A and 4B show that an example fuel cell cartridge 400 may include a housing 414 and divider 406 within the housing 414. The divider 406 separates a water cavity 402 from a reactor cavity 404. The divider 406, however, does allow some water to flow from the water cavity 402 to the reactor cavity 404. The reactor cavity 404 in this example stores a NaSi reactant 415, that generates hydrogen gas when in contact with water, as depicted in FIG. 4B. This hydrogen gas may be expelled from the fuel cell cartridge 400 and into a fuel cell to which the cartridge 400 is coupled.

While FIGS. 4A and 4B depict a divider 406 that is stationary within the housing 414, the present disclosure contemplates examples in which the divider 406 is movable within the housing 414 such that the water cavity 402 volume and the reactor cavity 404 volume both fluctuate based on the position of the movable divider 406.

Figures 5A, 5B:
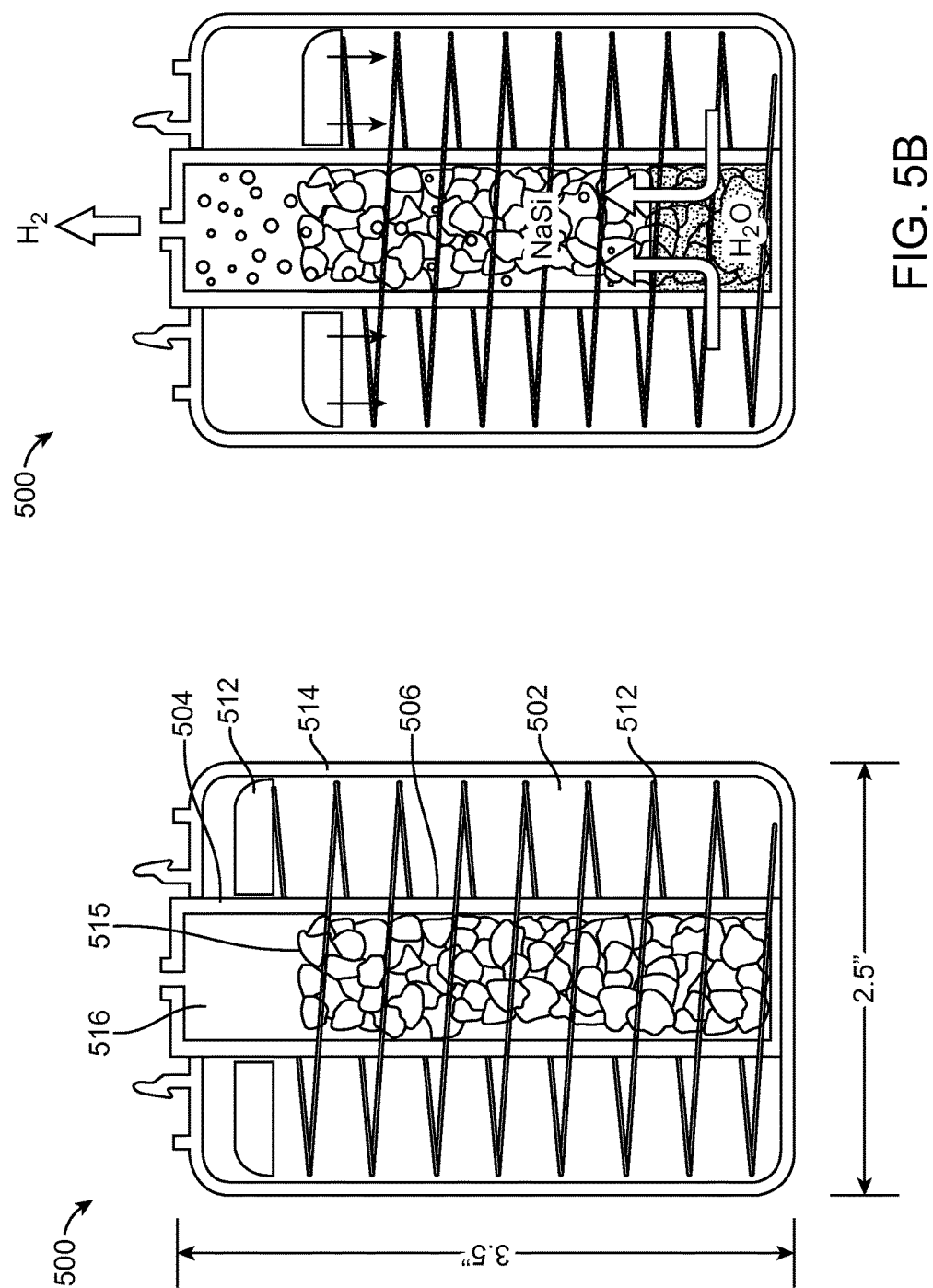

FIGS. 5A and 5B show that an example fuel cell cartridge 500 may include a housing 514 and divider 506 within the housing 514, albeit in a different configuration than the examples of FIGS. 4A and 4B. In these figures, the divider 506 separates a water cavity 502 from a reactor cavity 504 in a vertical cylindrical configuration. The divider 506 is essentially a cylinder within the larger diameter housing 514 of the cartridge 500 such that the water cavity 502 surrounds the reactor cavity 504. The divider 506 allows some water to flow from the water cavity 502 to the reactor cavity 504. The reactor cavity 504 in this example stores a NaSi reactant 515, that generates hydrogen gas when in contact with water, as depicted in FIG. 5B. This hydrogen gas may be expelled from the fuel cell cartridge 500 and into a fuel cell to which the cartridge 500 is coupled.

During operation, a piston 112, 412, 512, 612 in the water cavity 102, 402, 502, 602 may move such that a spring 112, 412, 512, 612 in the water cavity 102, 402, 502, 602 compresses or decompresses, thus altering the flow of water within the fuel cell cartridge 100, 400, 500, 600. As the hydrogen pressure builds, the water flowing into the reactor chamber 104, 404, 504, 604 stops. At this point, the hydrogen pressure matches or exceeds the water pressure caused by a spring 112, 412, 512, 612 pushing on a piston 112, 412, 512, 612. This subsequently halts the generation of additional hydrogen. The fuel cell then consumes the hydrogen as needed; as it does, the pressure in the reactor chamber 104, 404, 504, 604 falls slightly, thus allowing additional pressurized water to enter the reactor chamber 104, 404, 504, 604 and more hydrogen to be generated. This process continues.

In some examples, the piston 112, 412, 512, 612 may move by the pressure differential between the water module 102, 402, 502, 602 and the reactor module 104, 404, 504, 604. For example, FIG. 4A shows the piston 112, 412, 512, 612 in a "fresh" state. There is some positive pressure/inert gas/air in the air space 116, 416, 516, 616. The air space 116, 416, 516, 616 may contain porous filter elements. When the piston 112, 412, 512, 612 opening/valve is pierced when the fuel cell cartridge 100, 400, 500, 600 engages with a fuel cell system, this pressure is released, and the spring 112, 412, 512, 612 and piston 112, 412, 512, 612 move upward pushing water to react with the reactant 115, 415, 515, 615 (e.g., NaSi) thru the check valve. Hydrogen gas then fills the air space 116, 416, 516, 616 (as shown in FIG. 4B) and exits. If the fuel cell system is shut off, the hydrogen gas pressure keeps the spring 112, 412, 512, 612 in place and closes the check valve (as depicted in FIG. 1A). Excess pressure may be released through a relief valve.

When the piston 112, 412, 512, 612 is in a first position, the spring 112, 412, 512, 612 may be decompressed and the water may remain in the water cavity 102, 402, 502, 602 and not reacting with the reactant 115, 415, 515, 615 in the reactor cavity 104, 404, 504, 604. As the piston 112, 412, 512, 612 moves, the spring 112, 412, 512, 612 may start to compress and the water may start to flow from the water cavity 102, 402, 502, 602 into the reactor cavity 104, 404, 504, 604 (as depicted in FIG. 5B), and the water may begin reacting with the reactant 115, 415, 515, 615 in the reactor cavity 104, 404, 504, 604, causing hydrogen gas to be produced. As the piston 112, 412, 512, 612 moves to a second position, the spring 112, 412, 512, 612 may be compressed such that all or substantially all of the water from the water cavity 102, 402, 502, 602 is in the reactor cavity 104, 404, 504, 604, again causing hydrogen gas to be produced. The hydrogen gas may exit the fuel cell cartridge 100, 400, 500, 600 via a gas outlet, which may be in fluid communication with a fuel cell.

Figure 7B:
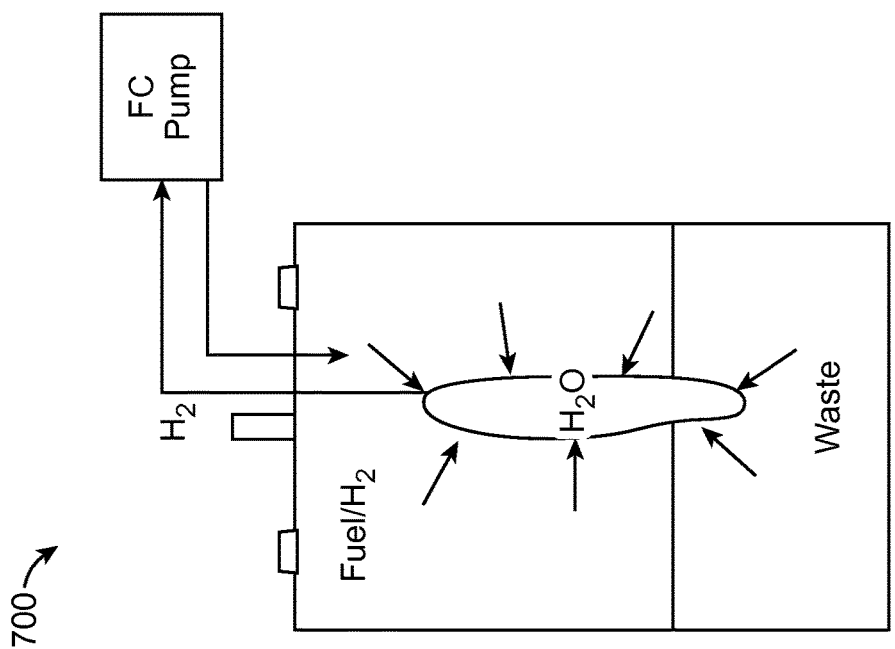
Figure 7A:
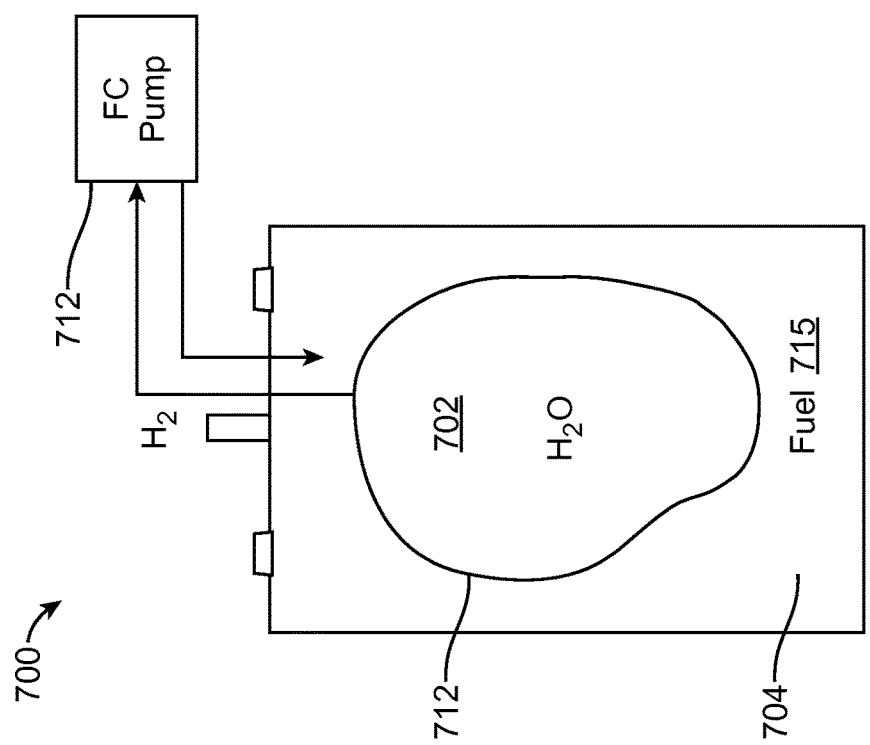

FIGS. 7A and 7B schematically depict another example fuel cell cartridge 700 in accordance with at least some examples of the present disclosure. These cartridges 700 are active cartridges that include a bladder 712 inside of (or defining) the water module 702 and a reactor module 704 defined between the bladder 712 and the walls of the fuel cell cartridge 700. The bladder 712 may expand or retract to alter the pressure of the fluid inside the cartridge 700. Changes in pressure in the cartridge 700 alter the flow of fluid in the cartridge 700. For example, FIG. 7A depicts that a bladder 712 is relatively full of water from the water pump 712. As the water pump 712 pumps water into the reactant/fuel 715 (e.g., NaSi), water inside the bladder 712 exits the fuel cell cartridge 700, as depicted in FIG. 7B. This allows more room for the water/reactant mixture in the reactor module 704. The chemical reaction of the reactant 715 and the water may create hydrogen gas and other byproducts (e.g., waste), in some examples. The hydrogen gas may exit the fuel cell cartridge 700 via the gas outlet, which may be in fluid communication with a fuel cell.

Figure 8:
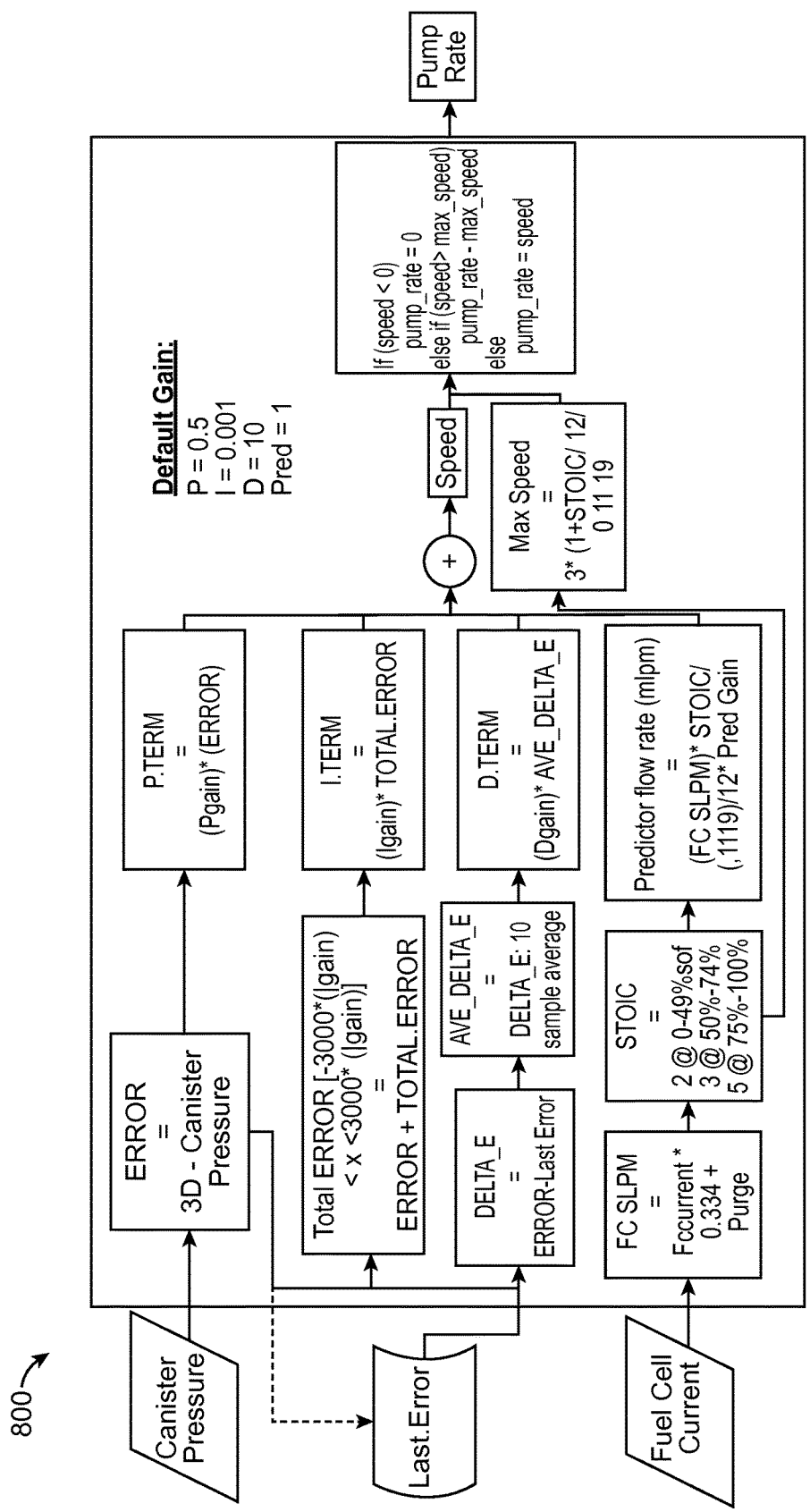
FIGS. 8 and 9 are schematic representations of example control systems for example fuel cell cartridges in accordance with at least some examples of the present disclosure.

FIG. 8 schematically depicts a detailed, example controller 800 for use with an active fuel cell cartridge. This Proportional-Integral-Derivative (PID) controller may be utilized with a pump on a water reactive system. In this configuration, a fuel cell current is used to calculate the present hydrogen consumption rate. Based on a system model incorporating % reacted, water reactive mix type, environmental temperature, and other parameters, the nominal water flow rate required may be estimated. Pressure may be used to generate an error based on the actual hydrogen pressure in the fuel cell cartridge versus the desire hydrogen pressure. The pressure error and the system model may be used by the PID control loop to then control the actual water flow rate in the fuel cell cartridge. Other control parameters and look-up tables are also included in this example. For example, in the presented system, the actual delivered water flow from a pump may decrease as the pressure of the system increases. A system model and pump drive may be appropriately compensated with a generated look-up table.

Figure 9:
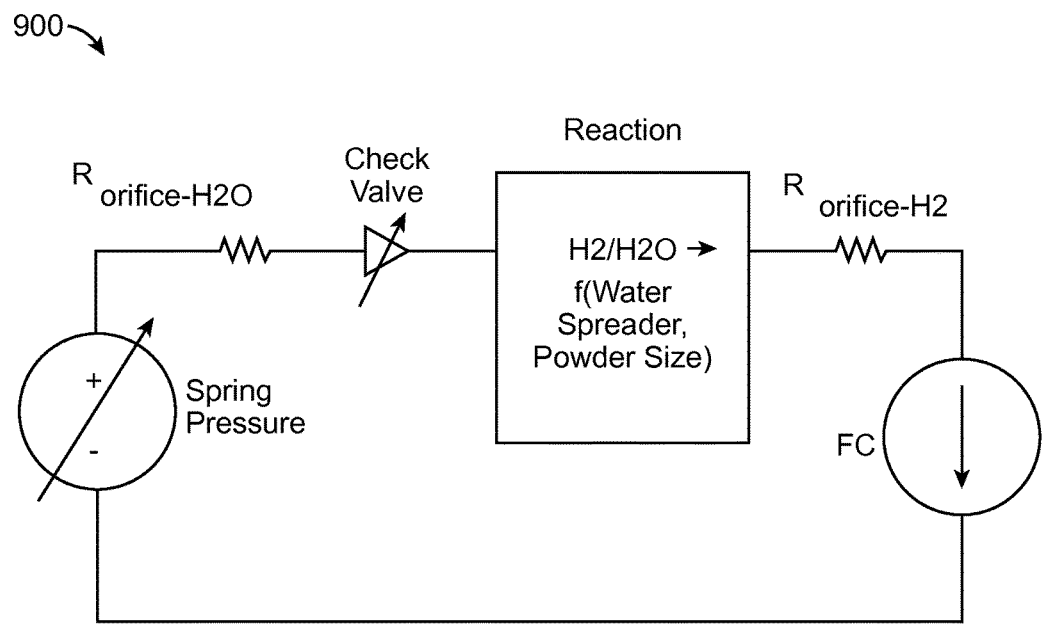

FIG. 9 depicts schematically an example passive fuel cell cartridge 900. The present disclosure contemplates that conventional fuel cells (FCs) typically operate at or near a constant pressure where the hydrogen consumed by the fuel cell is proportional to the sum of the generated electrical current plus any fuel cross over or purging losses. At steady-state conditions, the developed water pressure from a spring will be near equal to the functioning pressure of the fuel cell with some minor losses through components. The control components are primarily utilized in transient conditions. For example, at system start-up, the hydrogen pressure at the fuel cell is zero. When starting a passive system, there will be a comparably large pressure differential between the spring pressure and fuel cell pressure. This can create a significant water spike which then would result in a very large hydrogen pressure over-shoot due to some delays in the time of actual hydrogen generation. A water orifice (R-orifice-H2O) is used to slow down the in-rush of this water enabling a more gradual start-up.

A valve, such as a check valve, may be used to clamp the water pressure in the event of spurious hydrogen generation spikes. Failure to do so may cause the system to oscillate.

The reactor module converts liquid water to hydrogen gas through a chemical reaction.

R-orifice-H2 limits the pressure observed by the fuel cell in the event that there are spurious periods of hydrogen generation. In addition, the hydrogen cartridge may have a pressure relief valve (not shown). In the event of a high pressure condition, R-orifice-H2 will allow excessive gas pressure to be vented rather than transmitted to the fuel cell.

Water valves may be used to control the water to turn the reaction on or off. The valves can be configured to close to a water flow condition upon mechanical connection of the cartridge to the fuel cell. In some examples, an actuator could be used to control the valves on or off to provide additional controls to the passive architecture. The figure shows two water valves for redundancy. Other configurations such as a single water valve and a single hydrogen valve or multiple water valves and/or multiple hydrogen valves are within the scope of the present disclosure.

Figure 10:
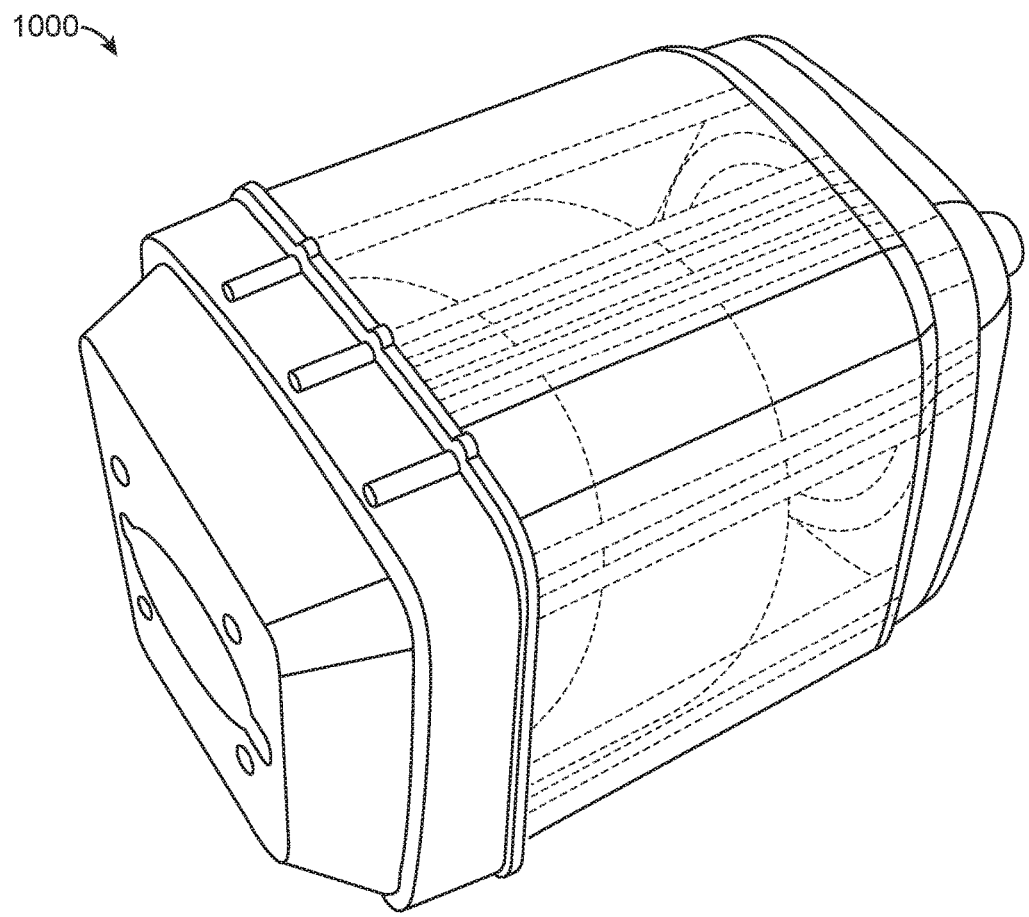
FIG. 10 is a perspective view of an example water module for an example fuel cell cartridge in accordance with at least some examples of the present disclosure.
Figure 11:
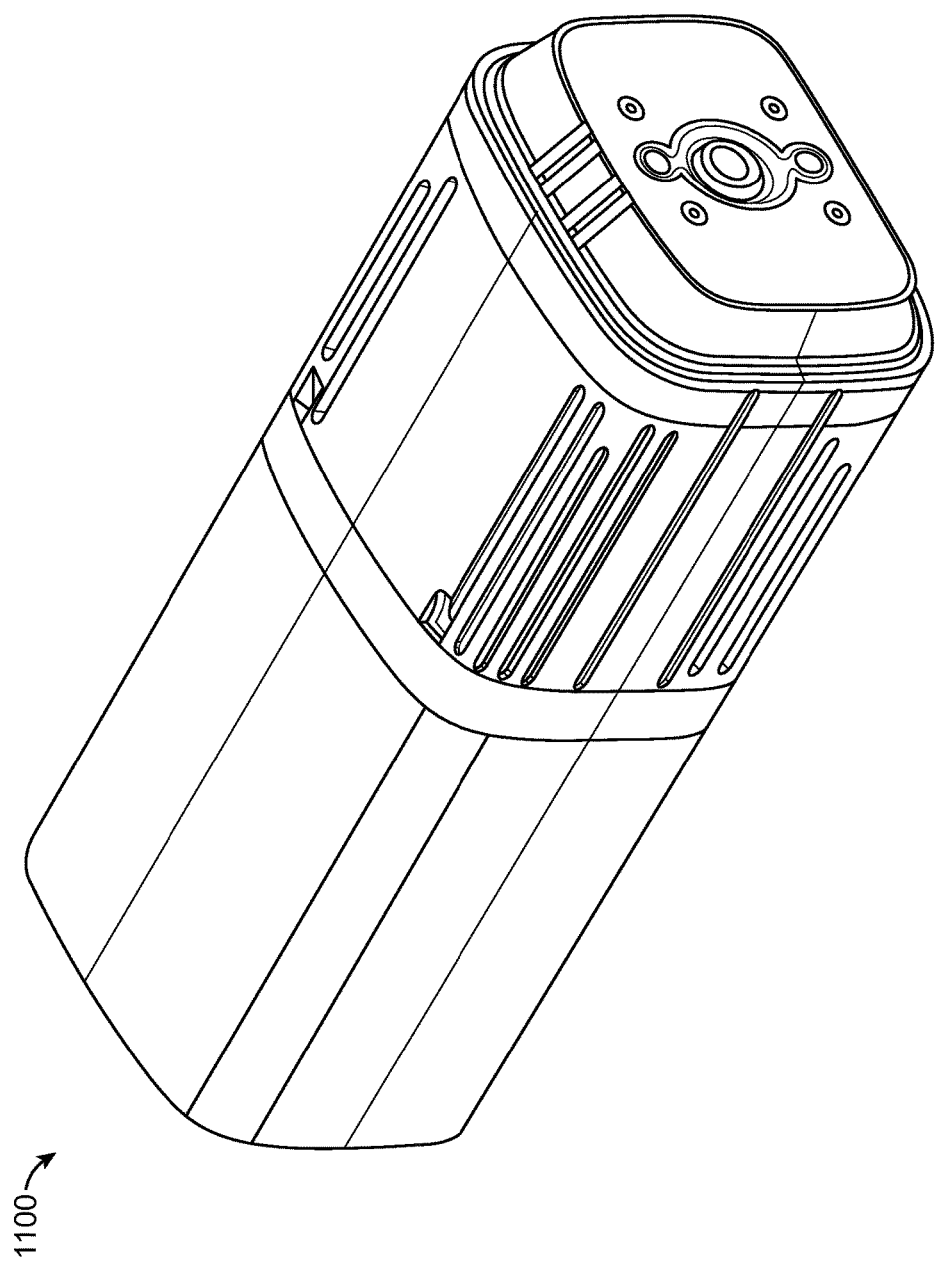
FIG. 11 is a perspective view of an example fuel cell cartridge in accordance with at least some examples of the present disclosure.
Figure 12:
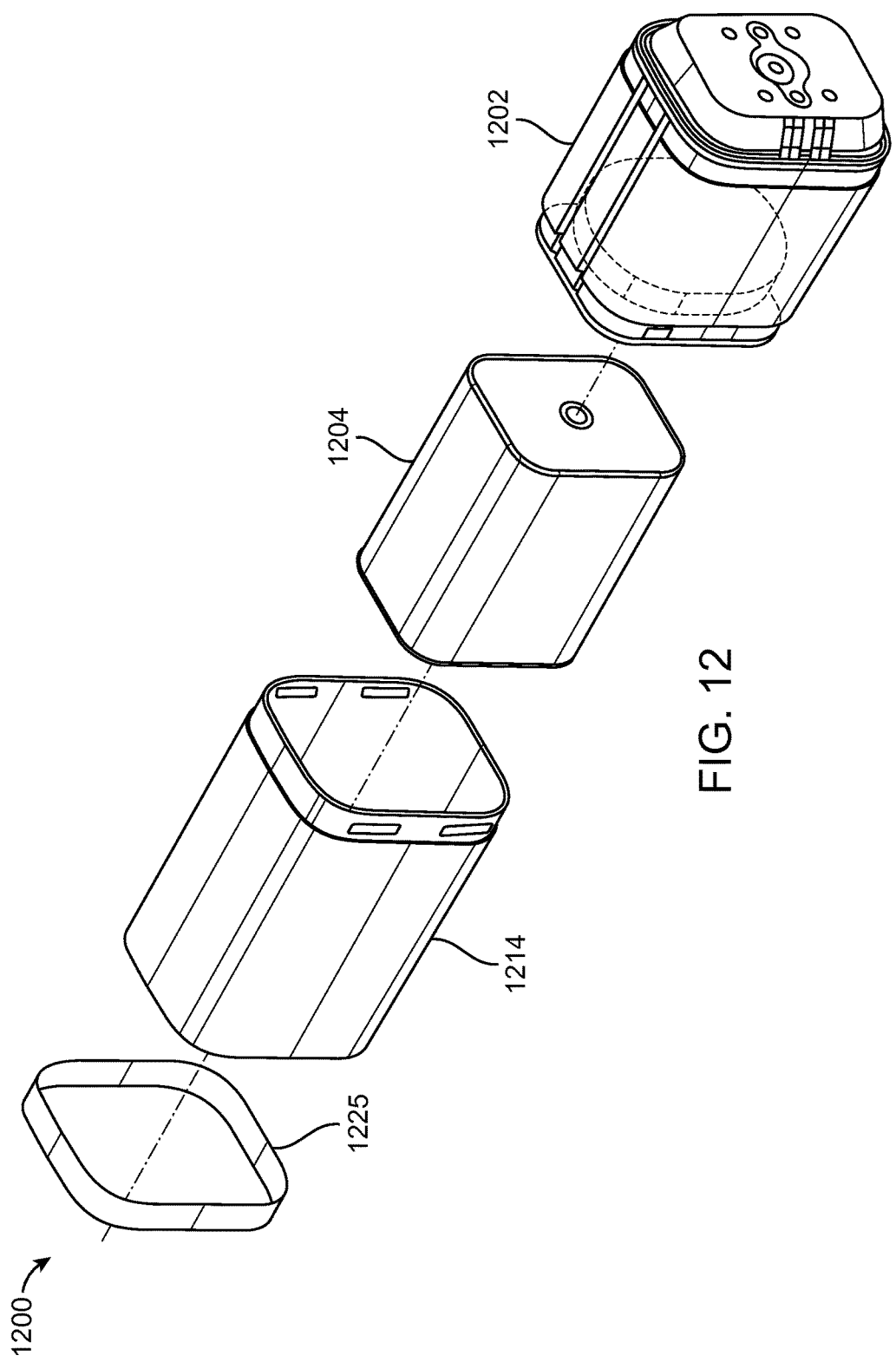
FIGS. 12-13 are exploded, perspective views of example fuel cell cartridges in accordance with at least some examples of the present disclosure.
Figure 13:
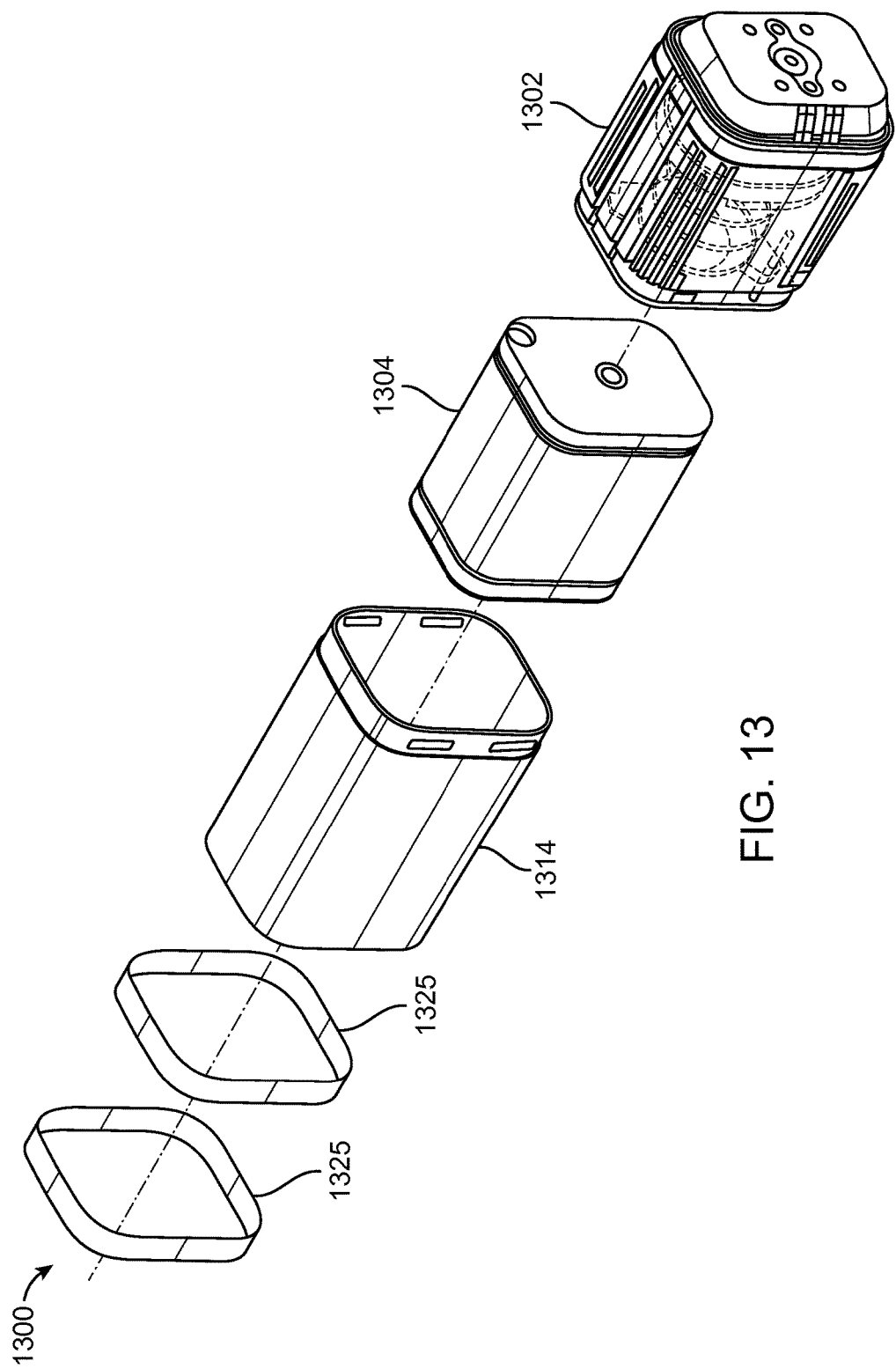
Figure 14:
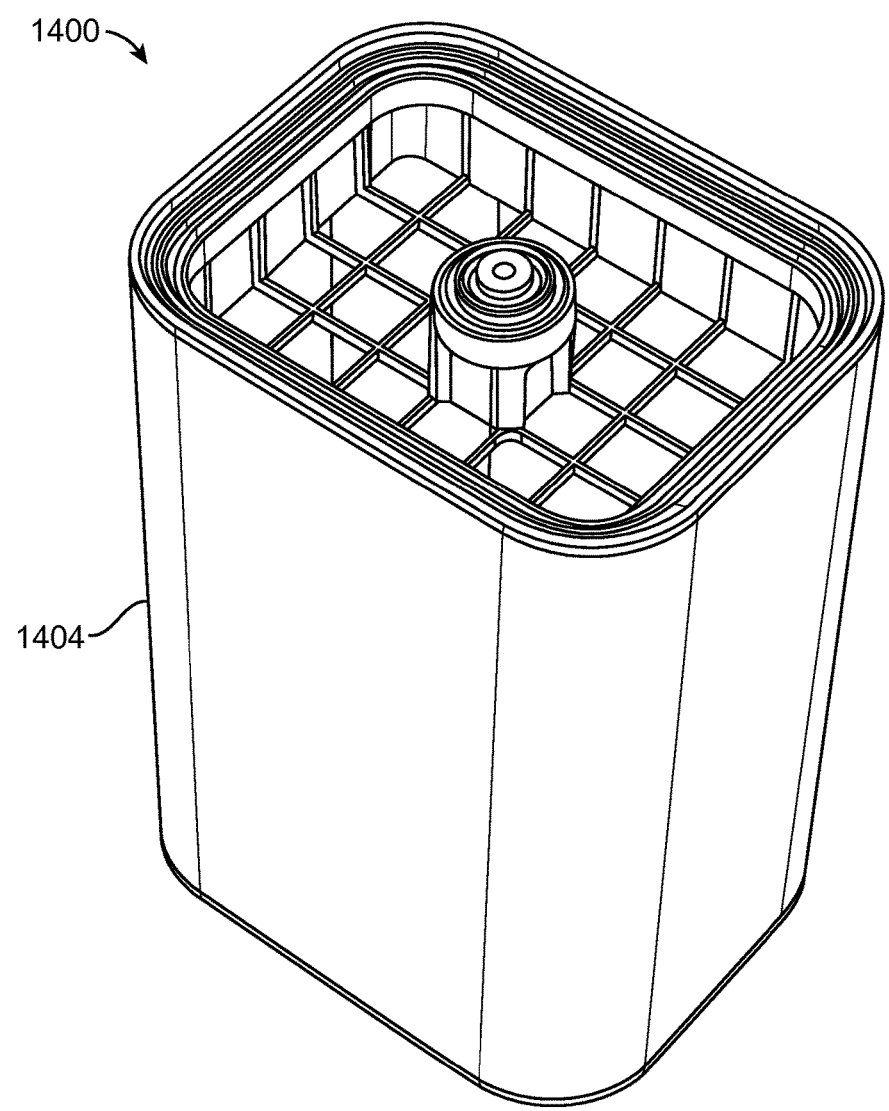
FIG. 14 is a perspective view of an example reactor module for an example fuel cell cartridge in accordance with at least some examples of the present disclosure.
Figure 15:
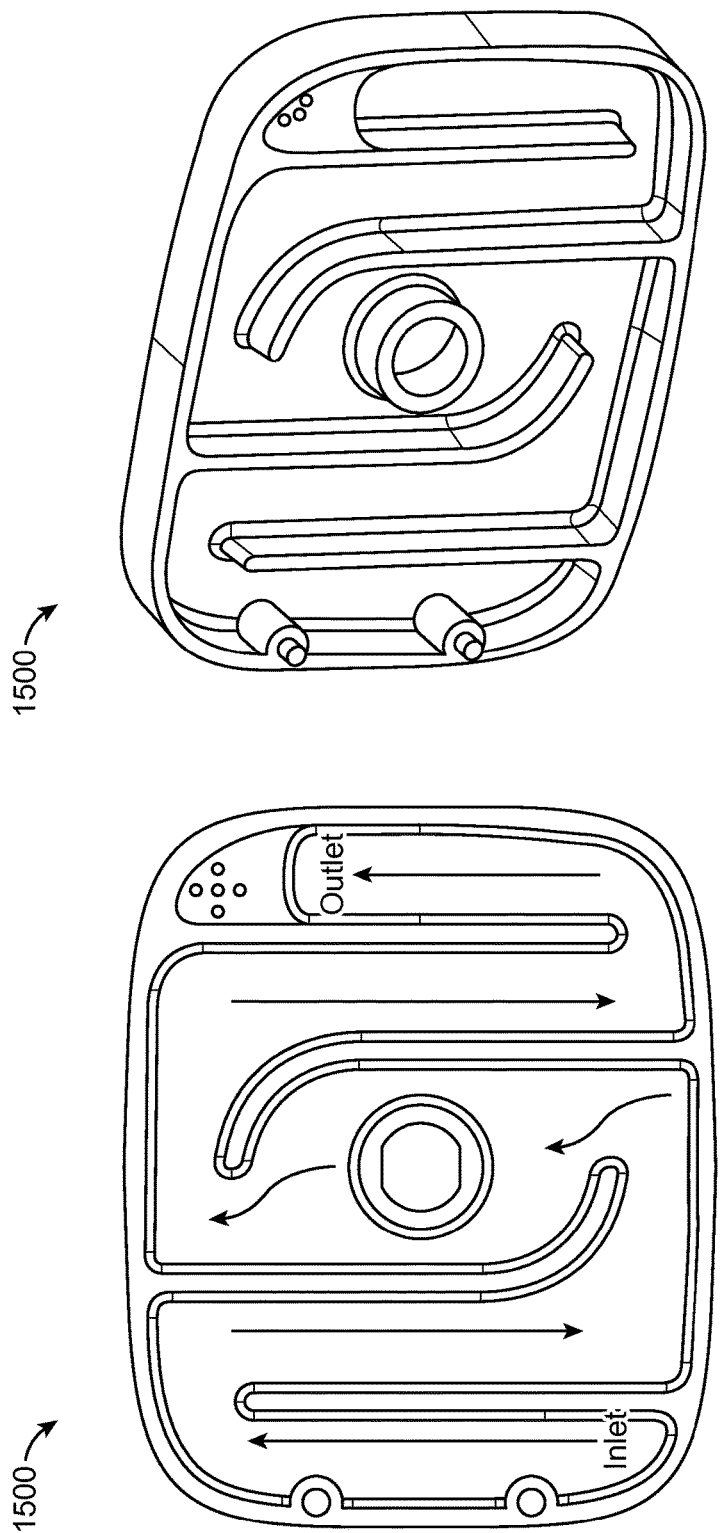
FIGS. 15A and 15B are top views of ends of example reactor modules for an example fuel cell cartridge in accordance with at least some examples of the present disclosure.
Figure 16:
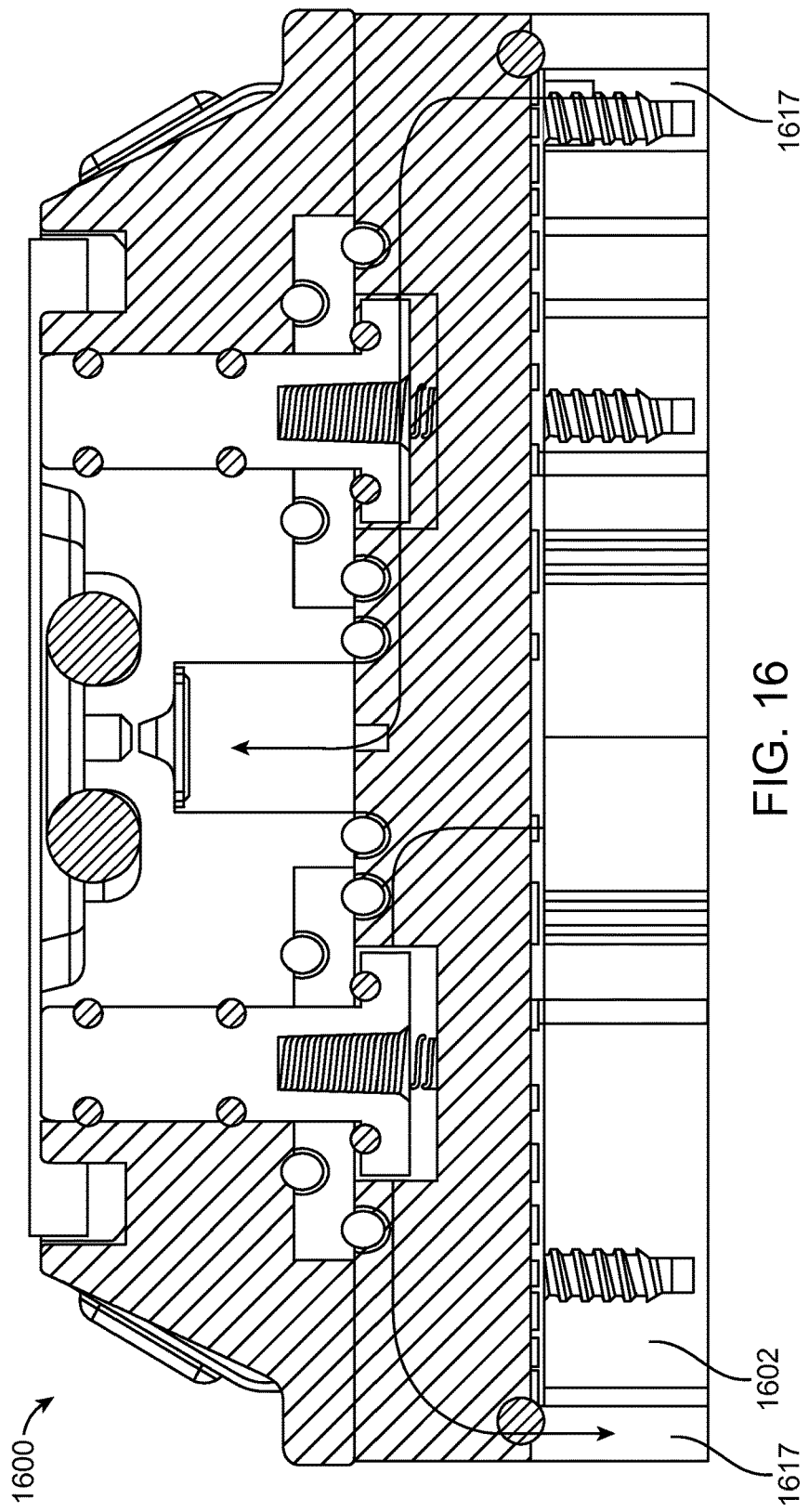
FIG. 16 is a perspective view of an example control manifold for an example fuel cell cartridge in accordance with at least some examples of the present disclosure.

FIG. 10 depicts an example fuel cell cartridge portion 1000 with a non-spring base pressure mechanism where a silicone bladder is inflated inside the water module. In the configuration shown, the bladder may have multiple functions including housing the water, pressurizing the water, providing a channel seal at a water module cap to water module housing interface, and providing a hydrogen seal at the water module cap to module housing interface.

FIGS. 11-20B depict various structural and operational aspects of example fuel cell cartridges 1100, 1200, 1300 and portions 1400, 1500, 1600, 1700, 1800, 1900, 2000, 2100 thereof, in accordance with at least some examples of the present disclosure. The example fuel cell cartridges 1100, 1200, 1300 and portions 1400, 1500, 1600, 1700, 1800, 1900, 2000, 2100 thereof in these figures may be used for applications in which portability may be a factor. In some example configurations, the example cartridges 1100, 1200, 1300 thereof may output 66 cc/min of hydrogen gas, which is approximately equivalent to 5 W net electrical power. Each cartridge 1100, 1200, 1300 may be capable of at least 19 liters of hydrogen gas, which is equivalent to approximately 25 W-hrs of energy. The cartridges 1100, 1200, 1300 may use a reactant, a water reactive material, such as sodium silicide or a sodium silicide/sodium borohydride blend. The water reactive material generates hydrogen when combined with water.

In the example fuel cell cartridges 1100, 1200, 1300 and portions 1400, 1500, 1600, 1700, 1800, 1900, 2000, 2100 thereof of FIGS. 11-20B, as the pressurized water enters the reactor module 1204, 1304, 1404 and interacts with the water, a reaction begins and there is a corresponding increase in hydrogen pressure. As the hydrogen pressure builds, the water flowing into the reactor module 1204, 1304, 1404 stops. At this point, the hydrogen pressure matches or exceeds the water pressure caused by a spring pushing on a piston. This subsequently halts the generation of additional hydrogen. A fuel cell coupled to the fuel cell cartridge 1100, 1200, 1300 may then consume the hydrogen as needed; as it does, the pressure in the reactor module 1204, 1304, 1404 falls slightly, thus allowing additional pressurized water to enter the reactor module 1204, 1304, 1404 and more hydrogen to be generated. This process continues as needed and yields a controlled generation and release of hydrogen to the fuel cell.

In some examples, the reactor module 1204, 1304, 1404 may be made as a separate entity from the water module 1202, 1302, 1402, 1602, 1702, 1802, 1902, 2002 and it may be assembled into a complete cartridge either at the factory or a service center. To achieve this objective, developed cartridge includes three key components: a reactor module 1204, 1304, 1404, a water module 1202, 1302, 1402, 1602, 1702, 1802, 1902, 2002, and a cartridge housing 1214, 1314.

The reactor module 1204, 1304, 1404 may contain NaSi/Na4BH4 fuel and gas permeable membranes on the top and bottom to allow the hydrogen to exit from the reactor module 1204, 1304, 1404 in all orientations. The reactor module 1204, 1304, 1404 may also include a water spreader, which distributes the water at approximately 200 locations within the reactor module 1204, 1304, 1404. This spreader may be configured to evenly control the water distribution. As shown in FIGS. 15A and 15B, a slip-on filtration cap 1500 may be used within a maze structure to lengthen the gas passage and extend the exposure to the filtration media. In some examples, a reactor housing reinforces the reactor module 1204, 1304, 1404 walls, captures potential liquid leakage, and provides pathways for the exiting hydrogen to enter the filter module. Both the reactor module 1204, 1304, 1404 and the filtration module may be housed within this reactor module housing. The reactor module 1204, 1304, 1404 may utilize a snap-on joining mechanism (e.g., magnetic) on the housing wall to attach it to the water module 1202, 1302, 1402, 1602, 1702, 1802, 1902, 2002. A band or bands 1225, 1325 may be used at the junction point to provide pressure on the gas seal, minimize the bending stress on the reactor module housing clips, and make the cartridge tamper resistant.

The interface 1811, 1911 on the water module 1802, 1902 to the reactor module may have protruded features to provide a sealed passage for gas and liquid to flow to or from the water module. At least one port may be dedicated to fluid and at least one port may be dedicated to gas. This interface 1811, 1911 enables the water module 1802, 1902 to be re-used with different reactor modules.

The water module 1802, 1902 may contain a volume of water that is sufficient to yield hydrogen to the fuel cell and may contain water delivery/control mechanisms. This module may comprise a water reservoir, a spring for water pressure, fuel cell interface activated water valves, refilling grommet, water control orifice, and a hydrogen exit orifice. The passive spring-loaded water injection may drive the water delivery via a pressure differential. With this architecture, a lower pressure in the fuel cartridge allows a more rapid injection of water to equalize the pressure. Likewise, an excessively high hydrogen generation rate in the cartridge may fully stop the water injection process.

A plunger 1813, 1913 may push the water into the water outlet and into the reactor module. Plungers 1813, 1913 may be any shape, including having cross-sectional shapes such as rectangular, semi-rectangular, and circular, among others. The plunger 1813, 1913 allows water/gas passage on two corners in the channels 1617, 1717 described herein. An alternate design could include a combination of gas/water pathways 1617, 1717 on all four corners. Water and/or gas filtration could be added to those pathways 1617, 1717 as needed. The pathways 1617, 1717 could customized such that the plunger 1813, 1913 maintains a symmetrically shape, which may make sealing easier.

Actuating valves are in place to control the water release; this ensures delivery of hydrogen only after the fuel cell is engaged.

In some examples, a grommet may be used for water refilling into the module after use so that module can be reused repeatedly when filled at a service center. A grommet, or a similar mechanism, can be used to allow water into the water module as it is filled, and to prevent leakages as it withstands the water pressure from within the water module. The grommet may be press fit into an undersized hole. It is therefore in a constant state of compression, which is necessary for it to provide a robust water seal. The durometer, tear strength, and thickness may all be customized parameters.

Figure 18B:
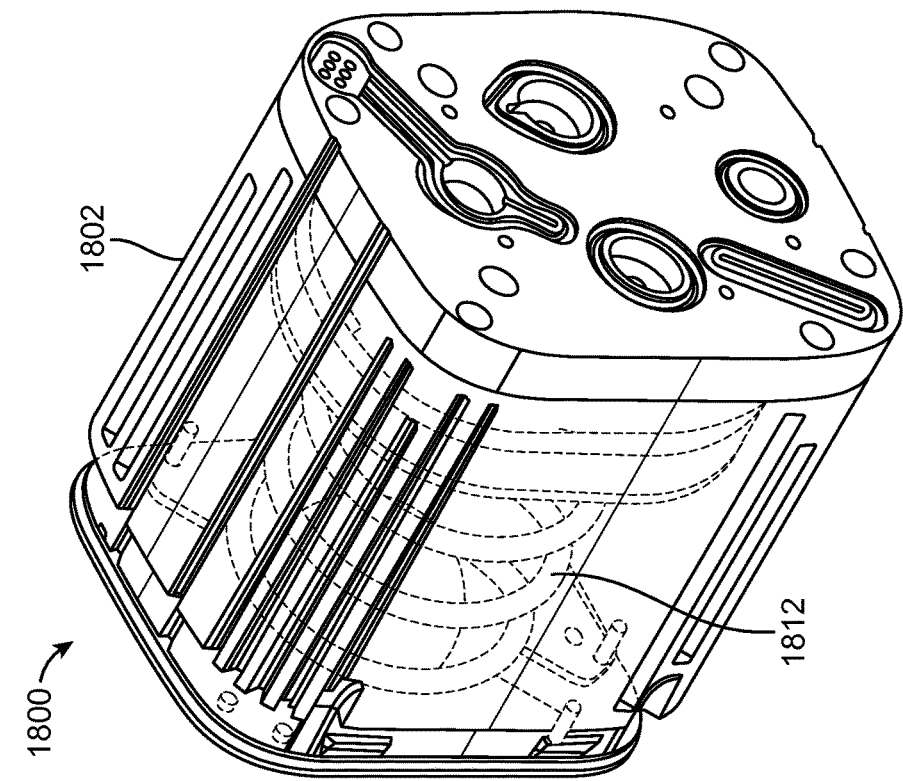
Figure 18A:
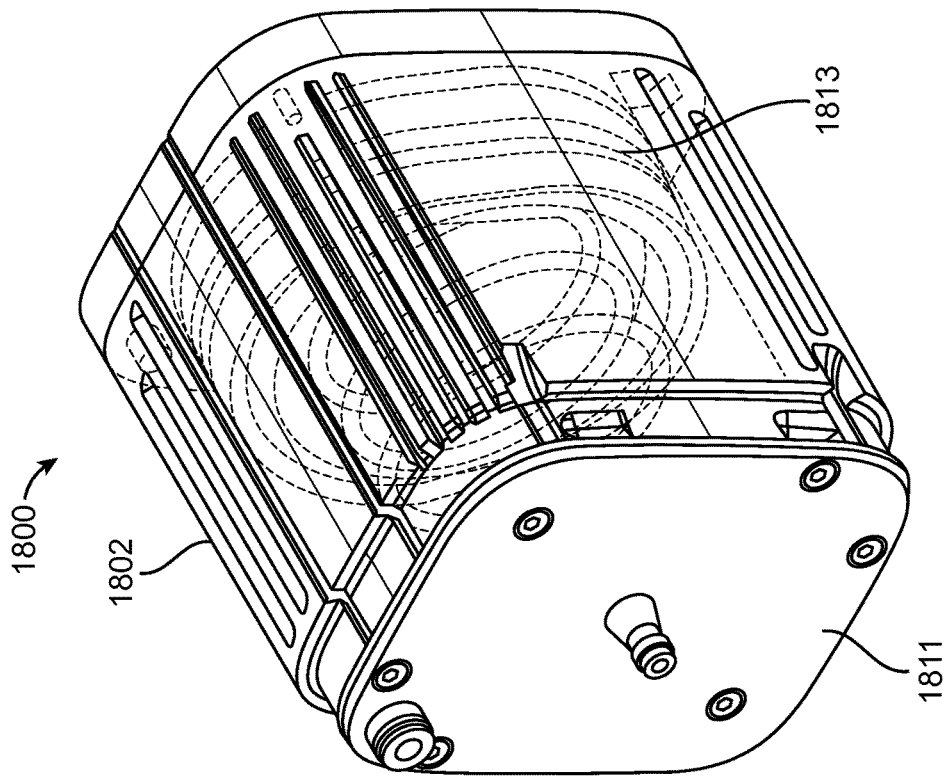
Figure 19:
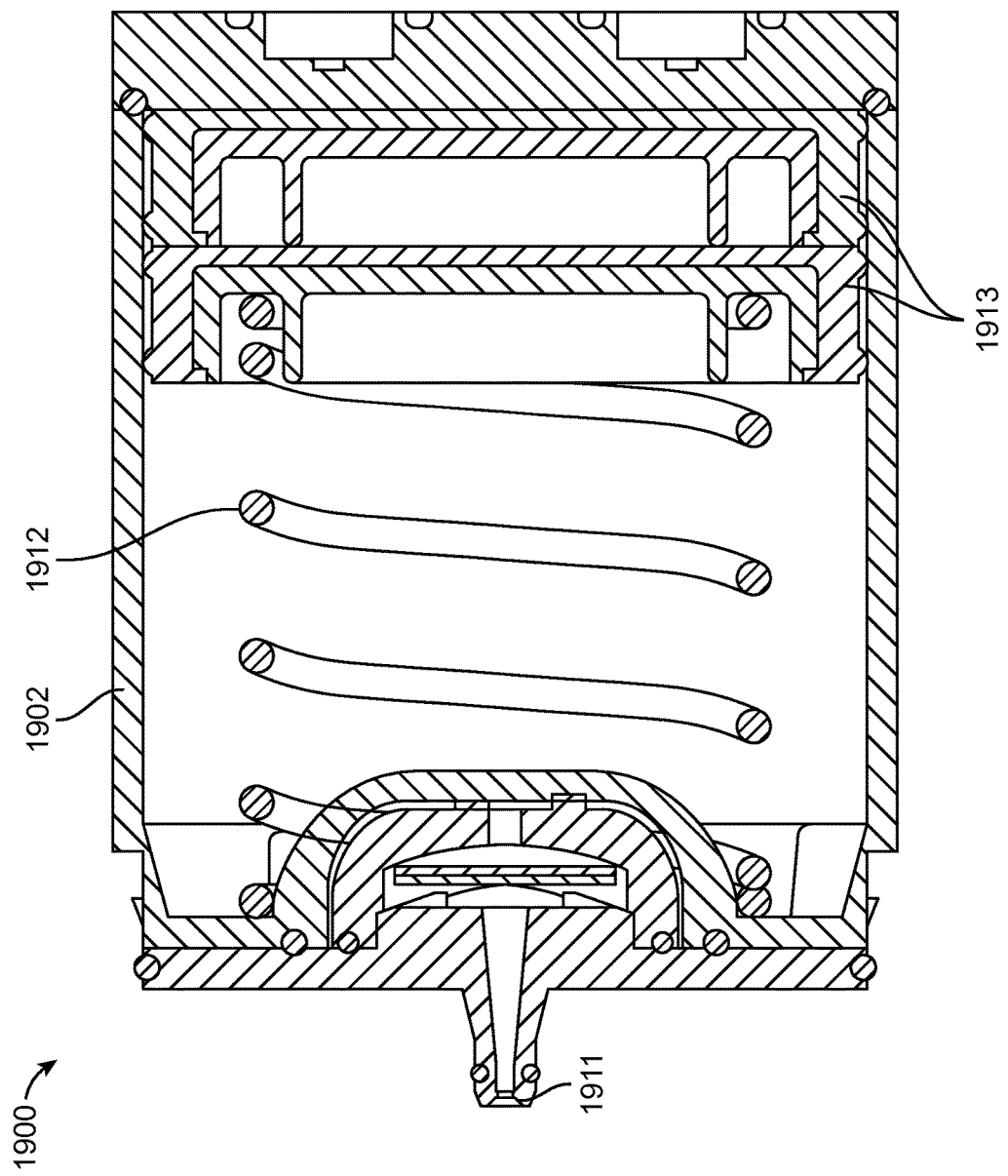
FIG. 19 is a cutaway, side view of an example water module for an example fuel cell cartridge in accordance with at least some examples of the present disclosure.

As shown in detail in FIGS. 18A, 18B, and 19, the water may be pressurized using a spring 1812, 1912 with a desired force vs. deflection profile tailored for the reactor module to enable self-regulating water delivery. The water will deliver into the reactor module when the downstream pressure is lower than the spring force at a certain deflection, and stop when the downstream pressure is too high. Water is delivered from the water module through a check valve. This regulating feature may prevent oscillatory and excessive delivery of additional water to the reactant. It may also be used to prevent product and/or byproduct from flowing upstream to the water supply.

Figure 17:
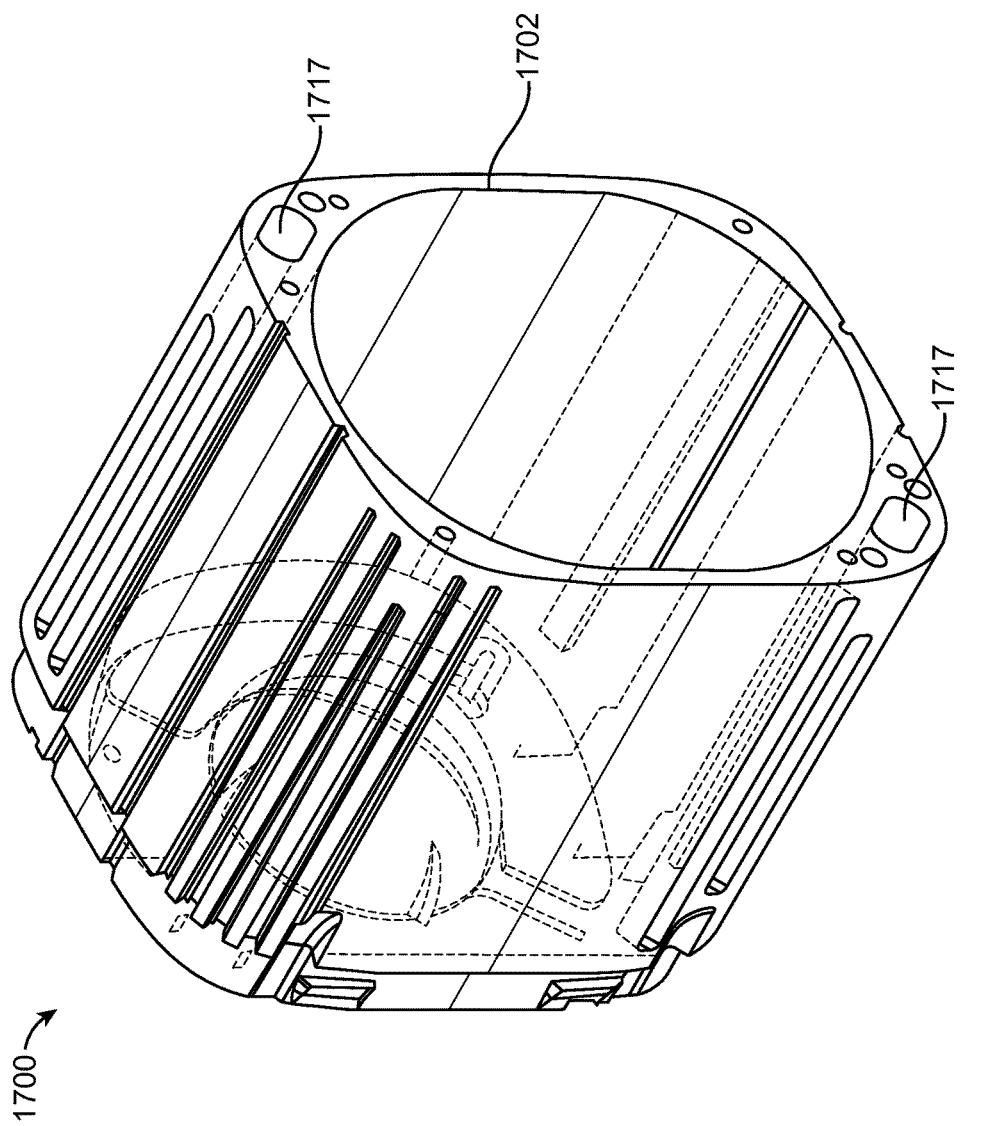
FIGS. 17, 18A, and 18B are perspective views of example water modules for an example fuel cell cartridge in accordance with at least some examples of the present disclosure.

As shown in FIG. 17, the water module 1702 may include channels 1717 for transporting gas or liquid along the length of the water module 1702 body to the control manifold. This may allow the control manifold to be located in one end of the cartridge. This may allow for the design of a reusable interface and simplify the implementation of control hardware.

The water module 1602, 1702, 1802, 1902, 2002 may be transparent to allow easy visualization of the amount of fuel that remains in the cartridge.

Figure 20A:
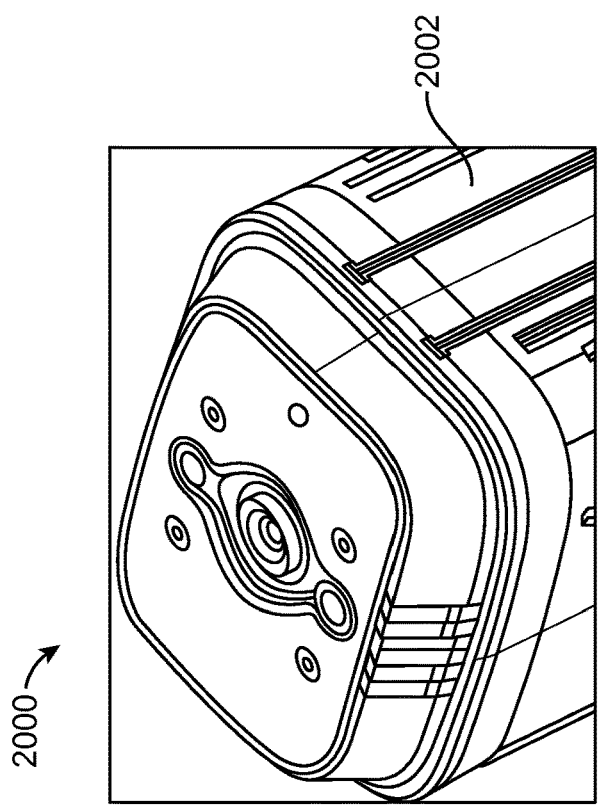
FIGS. 20A and 20B are perspective views of an example control manifold and example water module, respectively, for an example fuel cell cartridge in accordance with at least some examples of the present disclosure.

As shown in FIGS. 20A, upon the cartridge interface connection with the fuel cell system, the valves are actuated to allow flow to pass through the control manifold. Upon the cartridge disconnection, the valves will return to the shutoff position so that water and gas flow channels are sealed off to prevent leakages. These poppet valves are spring loaded with custom wave and/or compression springs custom sized to provide proper compression of the face seal.

The cartridge/fuel cell interface may include the control manifold, and may magnetically join the fuel cell to the cartridge. In this way, the fuel cell easily "snaps on" to the cartridge, making this an easy-to-use power delivery system. Two pins on the fuel cell may push down on the water valves in the cartridge. When the components are correctly joined, this allows water to flow into the reactor module. When the system is detached, a metal plate will be released and the water valves will reseal to a closed position, thus stopping the flow of water. The unique design of this cartridge/fuel cell interface allows hydrogen to be generated only when a cartridge is correctly joined with the fuel cell. The interface may also communicate memory chip data from the cartridge to the fuel cell.

The cartridge/fuel cell interface may enable snap action to secure the connection between the fuel cell and the cartridge with a gas seal around the hydrogen port or gas outlet. The snap action can be achieved by magnetics, or other mechanical locking feature that allows for connection and disconnection of the two halves without needing to directly or indirectly depress a latch. The same interface can provide a mechanical force on the water or hydrogen valves effectively starting and stopping hydrogen generation.

The same interface can provide data communication pins. For example, a memory chip can be placed on the cartridge facilitating reading of the cartridge serial number, state of the reactor, percent reacted, or other key variables. Data may also be written to the memory writing usability information, consumption information, or fuel cell usage parameters.

It was shown that a relatively small amount of magnetic force is needed to compress a seal required for hydrogen sealing. Example seals may include an o-ring or custom over-molded components.

Figure 20B:
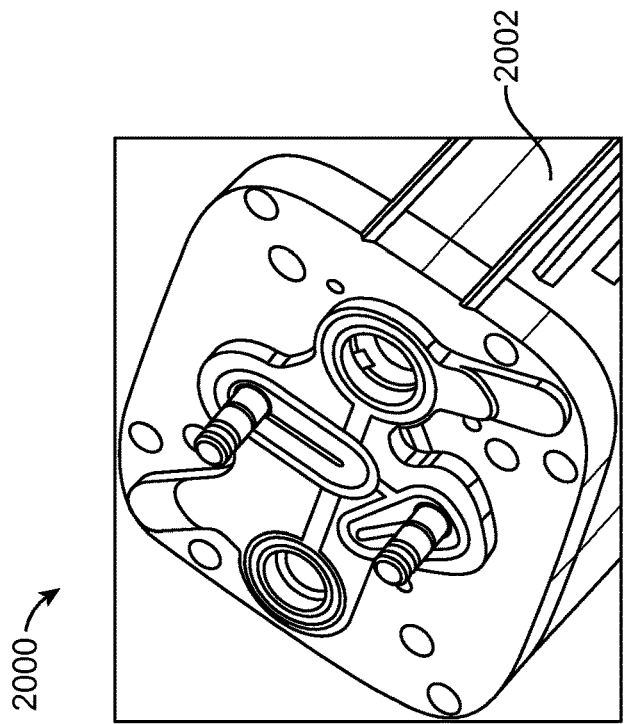
Figure 21A:
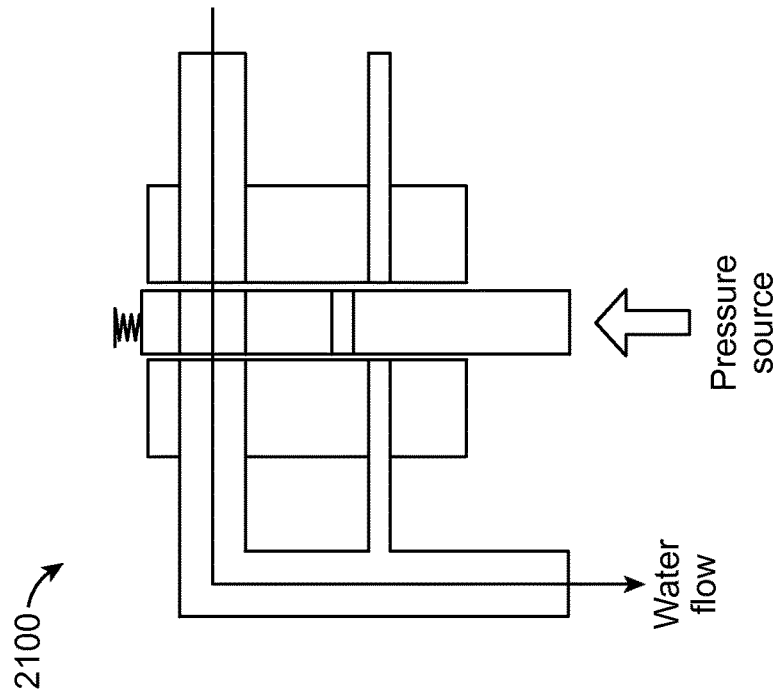
Figure 21B:
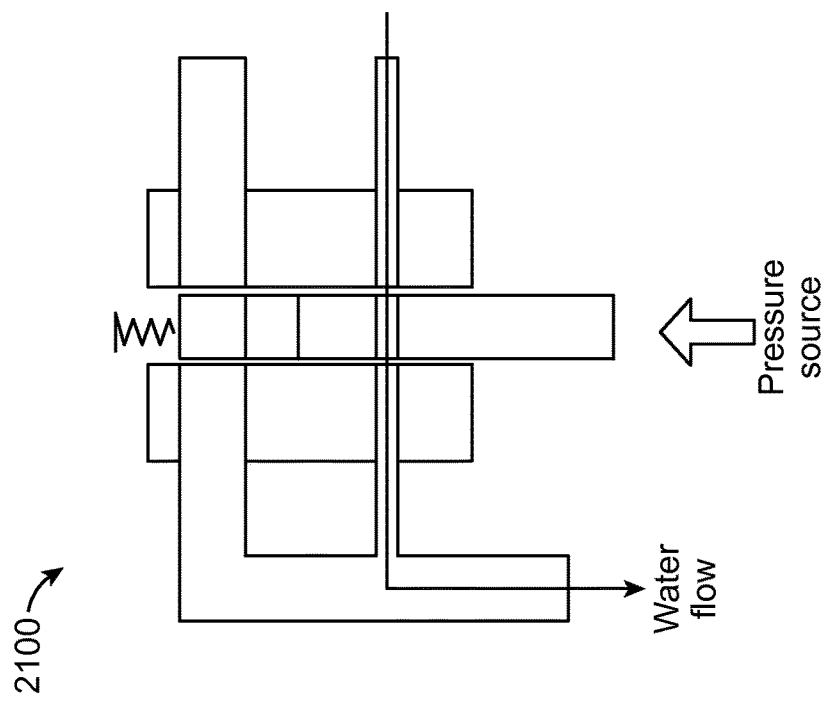

As shown in FIG. 20B, hydrogen valves may operate similarly to the actuating valves. Once hydrogen ports are shut off, remaining hydrogen is kept inside of the reactor, which may help with fuel conservation and safety.

FIGS. 21A, 21B, 22A, and 22B are schematic representations of example switching mechanisms 2100, 2200 for an example fuel cell cartridge in accordance with at least some examples of the present disclosure. These figures depict example pressure actuated valves 2100, 2200 to switch between water orifices for water flow rate control. This mechanism 2100, 2200 allows flow to be adjusted based on the pressure inside the reactor module. Pressure build-up in the reactor module actuates a valve which can change either the path of the water flow or the water orifice to create different restriction. This mechanism 2100, 2200 can either be reset or be non-resettable. It may be useful for start-up or start/restart operation when the water requirement is different from steady state operation.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of producing a hydrogen gas, the method comprising:
    coupling a first end of a water module to a reactor module, the water module storing water and the reactor module storing a reactant;
    controlling the flow of the water between the water module and the reactor module such that at least a portion of the water in the water module mixes with the reactant in the reactor module, thereby producing the hydrogen gas;
    channeling the hydrogen gas through at least one channel in the water module to a control manifold coupled to a second end of the water module, wherein the water module includes a body and a water reservoir in an internal volume within the body, and wherein the at least one channel is integrally formed along a length of the body and is distinct from the internal volume; and,
    coupling the control manifold to a fuel cell such that the hydrogen gas exits the control manifold into the fuel cell.

2. The method of claim 1, wherein controlling the flow of the water between the water module and the reactor module comprises regulating a pressure of the water and delivering water into the reactor module in response to a downstream pressure being less than a force being exerted on the water without an external control.

3. The method of claim 1, wherein controlling the flow of the water between the water module and the reactor module comprises controlling a pressure of the water using at least one of a spring, a piston, a bladder, a pressurized water source, a plunger, a gas overpressure, a gas pressure feedback, a valve, and a pump.

4. The method of claim 3, wherein the controlling the pressure of the water is performed using a plunger, wherein the water module further comprises the plunger, with the plunger configured to push on the water reservoir and advance through the internal volume within the body of the water module.

5. The method of claim 4, wherein the water module further comprises a spring configured to exert a spring force against the plunger.

6. The method of claim 4, wherein the plunger and the internal volume within the body of the water module each comprise a symmetrical cross-sectional shape.

7. The method of claim 1, wherein the channeling the hydrogen gas through at least one channel in the water module comprises channeling the hydrogen gas through two channels in the water module, with each channel integrally formed along a length of the body and distinct from the internal volume.

8. The method of claim 1, wherein the controlling the flow of the water between the water module and the reactor module comprises delivering water through a check valve.

9. The method of claim 1, the method further comprising:
    channeling the water through at least one water channel in the water module, wherein the at least one water channel is integrally formed along a length of the body of the water module and is distinct from the internal volume of the water module.

\* \* \* \* \*